(12) United States Patent
Taniguchi et al.

(10) Patent No.: US 12,257,552 B2
(45) Date of Patent: Mar. 25, 2025

(54) SEPARATION MEMBRANE ELEMENT

(71) Applicant: Toray Industries, Inc., Tokyo (JP)

(72) Inventors: Shu Taniguchi, Otsu (JP); Kentaro Takagi, Otsu (JP); Takeshi Konda, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 552 days.

(21) Appl. No.: 17/638,063

(22) PCT Filed: Aug. 26, 2020

(86) PCT No.: PCT/JP2020/032195
§ 371 (c)(1),
(2) Date: Feb. 24, 2022

(87) PCT Pub. No.: WO2021/039846
PCT Pub. Date: Mar. 4, 2021

(65) Prior Publication Data
US 2022/0314171 A1    Oct. 6, 2022

(30) Foreign Application Priority Data

Aug. 30, 2019 (JP) .................. 2019-157773
Dec. 23, 2019 (JP) .................. 2019-231577
May 29, 2020 (JP) .................. 2020-094335

(51) Int. Cl.
B01D 63/10 (2006.01)
B01D 65/08 (2006.01)
(Continued)

(52) U.S. Cl.
CPC .............. B01D 63/10 (2013.01); B01D 69/02 (2013.01); C02F 1/44 (2013.01); B01D 65/08 (2013.01); *B01D 2325/24* (2013.01)

(58) Field of Classification Search
CPC ........ B01D 63/10; B01D 69/02; B01D 65/08; B01D 2325/24; B01D 2313/143;
(Continued)

(56) References Cited

U.S. PATENT DOCUMENTS 3,067,084 A    12/1962 Nalle, Jr.
6,656,362 B1   12/2003 Kihara et al.
(Continued)

FOREIGN PATENT DOCUMENTS

CN       1655863 A    8/2005
CN     101098745 A    1/2008
(Continued)

OTHER PUBLICATIONS

English Translation of JP 2015009182 A. (Year: 2015).*
(Continued)

*Primary Examiner* — Terry K Cecil
(74) *Attorney, Agent, or Firm* — BUCHANAN INGERSOLL & ROONEY PC

(57) ABSTRACT

The present invention relates to a separation membrane element including a supply-side channel member, in which: the supply-side channel member has a net shape in which plural fibrous rows X including fibrous objects A and plural fibrous rows Y including fibrous objects B cross each other sterically to form intersections; at least one of the fibrous objects A and the fibrous objects B have a large diameter portion and a small diameter portion along a longitudinal direction; at least one of the fibrous objects A and the fibrous objects B include a thread that is thinner at a central portion located between intersection portions than at the large diameter portion; and a fiber between an arbitrary intersection and an adjacent intersection is a tapered fiber whose diameter increases like a taper in a direction from one intersection to the other intersection.

10 Claims, 9 Drawing Sheets

(51) Int. Cl.
*B01D 69/02* (2006.01)
*C02F 1/44* (2023.01)

(58) Field of Classification Search
CPC ..... B01D 2313/146; C02F 1/44; D04B 21/12; D04B 1/102; D04B 1/22; D10B 2505/04; Y02A 20/131
See application file for complete search history.

(56) References Cited

U.S. PATENT DOCUMENTS

| | | |
|---|---|---|
| 2003/0205520 A1 | 11/2003 | Johnson |
| 2008/0190836 A1 | 8/2008 | Beppu et al. |
| 2013/0341264 A1 | 12/2013 | Kidwell |
| 2015/0001151 A1 | 1/2015 | Nakano et al. |
| 2015/0144550 A1 | 5/2015 | Okamoto et al. |
| 2018/0161729 A1 | 6/2018 | Yaeger et al. |
| 2018/0207586 A1 | 7/2018 | Choi et al. |
| 2018/0280886 A1 | 10/2018 | Kim et al. |
| 2019/0111396 A1 | 4/2019 | Kidwell |
| 2020/0078739 A1 | 3/2020 | Hirozawa et al. |
| 2021/0069650 A1 | 3/2021 | Kim et al. |

FOREIGN PATENT DOCUMENTS

| | | |
|---|---|---|
| CN | 203507832 U | 4/2014 |
| CN | 104250041 A | 12/2014 |
| CN | 104379240 A | 2/2015 |
| EP | 1944076 A1 | 7/2008 |
| JP | 10118468 A | 5/1998 |
| JP | 2000000437 A | 1/2000 |
| JP | 2006507919 A | 3/2006 |
| JP | 2007117949 A | 5/2007 |
| JP | 2012187574 A | 10/2012 |
| JP | 2015009182 A * | 1/2015 |
| JP | 2015526282 A | 9/2015 |
| JP | 2015205269 A | 11/2015 |
| JP | 2018015735 A | 2/2018 |
| JP | 2018509293 A | 4/2018 |
| WO | 03092872 A1 | 11/2003 |
| WO | 2016092643 A1 | 6/2016 |
| WO | 2018221103 A1 | 12/2018 |
| WO | 2021039846 A1 | 3/2021 |

OTHER PUBLICATIONS

International Search Report and Written Opinion for International Application No. PCT/JP2020/032195, dated Oct. 1, 20, 2020, 6 pages.
Extended European Search Report for European Application No. 20858547.1, dated Aug. 18, 2023, 11 pages.
Chinese Office Action for Chinese Application No. 202080061347.0, dated Jan. 9, 2024 with English translation, 12 pages.
Chinese Office Action for Chinese Application No. 202080061347.0, dated Oct. 11, 2023 with partial translation, 10 pages.
Office Action (Communication pursuant to Article 94(3) EPC) issued Feb. 27, 2024, by the European Patent Office in corresponding European Patent Application No. 20 858 547.1-1101. (8 pages).
Indian Examination Report for Indian Application No. 202247010202, dated May 1, 2023, with translation, 5 pages.
Office Action (Substantive Examination Report) issued Aug. 1, 2024, by the Saudi Authority for Intellectual Property in corresponding Saudi Patent Application No. 522431754 and an English translation of the Office Action. (13 pages).
Chinese Office Action for Chinese Application No. 202080061347.0, dated Jun. 27, 2023 with partial translation, 15 pages.

* cited by examiner

Supply water flow direction

SEPARATION MEMBRANE ELEMENT

CROSS REFERENCE TO RELATED APPLICATIONS

This is the U.S. National Phase application of PCT/JP2020/032195, filed Aug. 26, 2020, which claims priority to Japanese Patent Application No. 2019-157773, filed Aug. 30, 2019, Japanese Patent Application No. 2019-231577, filed Dec. 23, 2019 and Japanese Patent Application No. 2020-094335, filed May 29, 2020, the disclosures of these applications being incorporated herein by reference in their entireties for all purposes.

FIELD OF THE INVENTION

The present invention relates to a separation membrane element to be used for separating impurities from various kinds of liquid containing impurities, in particular, to be used for desalination of seawater and brackish water, manufacture of ultrapure water, wastewater treatment, etc.

BACKGROUND OF THE INVENTION

Among techniques for removing ionic substances contained in seawater, brackish water, etc., a separation method using a separation membrane element has come to be used widely in recent years as a process for energy saving and resource saving. Separation membranes used for the separation method using a separation membrane element are classified, according to the hole diameter and separation function, into a microfiltration membrane, an ultrafiltration membrane, a nanofiltration membrane, a reverse osmosis membrane, and a forward osmosis membrane. These kinds of membranes are used for, for example, manufacture of drinking water from seawater, brackish water, water containing harmful substances, etc., manufacture of industrial ultrapure water, and wastewater treatment and collection of valuables, and are used suitably for respective target components to be separated on the basis of respective kinds of separation performance.

Whereas there are various forms of separation membrane elements, they have a common feature that raw water is supplied to one surface of a separation membrane and permeated fluid is obtained from the other surface. Equipped with many bundled separation membranes, a separation membrane element is formed so that the membrane area per separation membrane element becomes large, that is, the amount of permeated fluid obtained per separation membrane element becomes large. Various kinds of shapes such as a spiral type, a hollow fiber type, a plate-and-frame type, a rotating flat-sheet membrane type, and a flat membranes accumulation type are proposed for separation membrane elements so as to meet uses and purposes.

For example, spiral-type separation membrane elements are used widely for reverse osmosis filtration. Spiral-type separation membrane element includes a water collecting pipe and a separation membrane unit that is wound around the water collecting pipe. The separation membrane unit is formed by stacking supply-side channel members for supplying raw water (i.e., water to be treated) as supply water to the surfaces of separation membranes, the separation membranes for separating components contained in the raw water, and permeation-side channel members for guiding permeate that has permeated through the separation membranes and has thereby been separated from the supply water to the water collecting pipe. Enabling application of pressure to raw water, spiral-type separation membrane elements are used preferably because they make it possible to take out a large amount of permeated fluid.

In treating supply water using a separation membrane element, concentration polarization may occur in which substances dissolved in supply water, such as salts, form a concentration gradient in the direction perpendicular to the separation membrane. A reduction in element performance due to such concentration polarization can be suppressed by, for example, decreasing the thickness of a concentration polarization layer formed on the membrane surface by decreasing the thickness of the supply-side channel member and increasing the membrane surface linear velocity of supply water. However, the thickness reduction of the supply-side channel member causes problems. For example, fouling substances produced by microbes and impurities in supply water clog the supply-side channel, resulting in reduction in element performance. For another example, a resulting pressure loss in the element becomes large to require a pump for supplying supply water to produce more power, resulting in an increased electricity cost and damage of the element. In view of this, measures for increasing the performance of a separation membrane element by improving the supply-side channel member have been proposed.

More specifically, Patent documents 1 and 2 each propose a net whose flow resistance is decreased by controlling the arrangement of fibrous objects in a supply-side channel member. As disclosed in Patent document 3, a fabric channel member has been conceived in which warps and wefts are non-circular in cross section.

PATENT LITERATURE

Patent document 1: JP-T-2015-526282 (The symbol "JP-T" as used herein means a published Japanese translation of a PCT patent application.)
Patent document 2: JP-A-2000-000437
Patent document 3: JP-A-H10-118468

SUMMARY OF THE INVENTION

However, the above-mentioned separation membrane elements are insufficient in the balance between the reduction of the flow resistance of the supply-side channel and the suppression of concentration polarization. Furthermore, there may occur an event that, when a separation membrane element is constructed, a supply water inflow end surface portion and the supply-side channel inside the element are partially clogged due to membrane deformation. In view of these problems, an object of the present invention is to provide a separation membrane element capable of suppressing concentration polarization while decreasing the flow resistance of the supply-side channel by suppressing clogging of a supply water inflow end surface portion and the supply-side channel inside the element.

To attain the above object, the invention provides a separation membrane element including at least a water collecting pipe, separation membranes, a supply-side channel member, and a permeation-side channel member, in which:

the supply-side channel member is interposed between two surfaces of the separation membranes to form a supply-side channel;

the supply-side channel member has a net shape in which plural fibrous rows X including fibrous objects A and arranged in one direction and plural fibrous rows Y including fibrous objects B and arranged in a different direction than the fibrous rows X cross each other sterically to form intersections;

at least one of the fibrous objects A and the fibrous objects B have a large diameter portion and a small diameter portion along a longitudinal direction;

in a longitudinal cross section including an arbitrary fibrous row and taken along a longitudinal direction of the arbitrary fibrous row, at least one of the fibrous objects A and the fibrous objects B includes a thread that is thinner at a central portion located between intersection portions of the fibrous rows X and the fibrous rows Y than at the large diameter portion;

a supply-side channel area ratio is in a range of 45% to 65%; and when a surface of the supply-side channel member is observed from a thickness direction, a fiber between an arbitrary intersection and an adjacent intersection is a tapered fiber whose diameter increases like a taper in a direction from one intersection to the other intersection.

A preferable mode of the invention provides a separation membrane element in which the tapered fiber has a taper ratio in a range of 1/20 to 1/3.

A preferable mode of the invention provides a separation membrane element in which the tapered fiber has a tapered shape from a raw water side toward a concentrate side.

A preferable mode of the invention provides a separation membrane element in which the supply-side channel member has a bending resistance (m) larger than or equal to 0.07 m and smaller than or equal to 0.14 m.

A preferable mode of the invention provides a separation membrane element in which the supply-side channel member has a ratio of a void volume v to a total volume V which is represented by a product of a thickness and an area of the supply-side channel member in a range of 90% to 97%.

A preferable mode of the invention provides a separation membrane element in which a ratio of a supply-side channel volume F of the separation membrane element to the void volume v of the supply-side channel member is larger than or equal to 90%.

A preferable mode of the invention provides a separation membrane element in which an interval between intersection portions in a direction perpendicular to a raw water flow direction of the supply-side channel member is in a range of 3 to 5 mm.

A preferable mode of the invention provides a separation membrane element in which an interval between intersection portions in a direction parallel with a raw water flow direction of the supply-side channel member is in a range of 4 to 8 mm.

A preferable mode of the invention provides a separation membrane element in which in a transverse cross section Z taken perpendicularly to a longitudinal direction of an arbitrary fibrous object of the supply-side channel member, the supply-side channel member satisfies a relationship of $1.2 < W_1/W_2 < 3.0$, where $W_1$ is a maximum diameter of the arbitrary fibrous object and $W_2$ is a maximum diameter in a direction perpendicular to the direction of the maximum diameter $W_1$.

Furthermore, a preferable mode of the invention provides a separation membrane element in which the permeation-side channel member is made of a circular-knit tricot.

Capable of lowering concentration polarization while suppressing differential pressure increase due to clogging of the supply-side channel, the invention can provide a separation membrane element that is superior in operation stability. Furthermore, in the separation membrane element according to the invention, since the supply-side channel member can be made thinner, the area of membranes packed per element, that is, the element water production rate, can be increased. Still further, in the separation membrane element according to the invention, since each fibrous object has tapered portions when a surface of the supply-side channel member is observed from its thickness direction, the frequency of occurrences of rapid expansion and contraction of the channel is decreased and the flow resistance can thereby be lowered. In addition, since the three-dimensional shape of each fiber intersection portion is gentle, damaging of the membrane surfaces of each separation membrane can be suppressed.

DETAILED DESCRIPTION OF EMBODIMENTS OF THE INVENTION

An embodiment of the present invention will be hereinafter described in detail.

In this specification, the terms "mass" and "weight" are the same in meaning. Furthermore, in the specification, the mark "−" means that numerical values written before and after it are included as a lower limit value and an upper limit value.

<Separation Membrane Element>

A separation membrane element according to the invention includes at least a water collecting pipe, a separation membrane, a supply-side channel member, and a permeation-side channel member.

Figure 1:
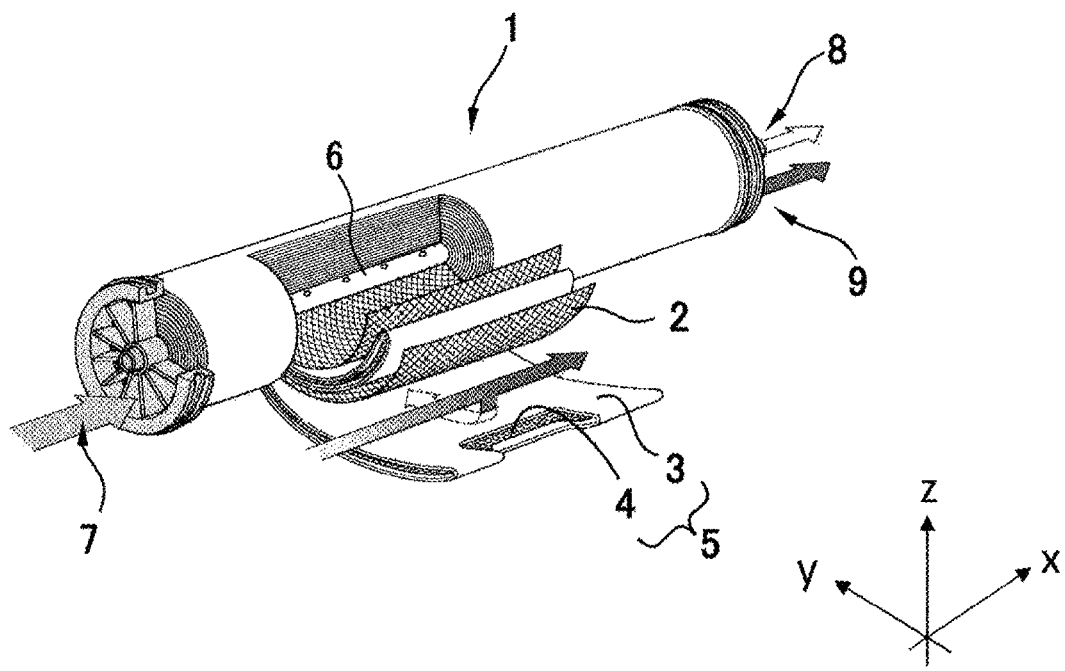
FIG. 1 is a partially developed perspective view showing an example separation membrane element.

In a spiral-type separation membrane element 1 shown in FIG. 1, nets made of a polymer are used as supply-side channel members 2 which form supply-side channels. To prevent falling of separation membranes 3 and form permeation-side channels, tricot that is smaller in fiber interval than the supply-side channel members 2 is used as permeation-side channel members 4. Each envelope-like membrane 5 is formed by a permeation-side channel member 4 and a separation membrane 3 two pieces of which are laid on the two respective surfaces of the permeation-side channel member 4 and bonded to each other to form an envelope shape. The inside of each envelope-like membrane 5 serves as a permeation-side channel. The supply-side channel members 2 and the envelope-like membranes 5 which are laid alternately are wound spirally in such a manner that prescribed opening-side portions are bonded to the outer circumferential surface of a water collecting pipe 6. The x-axis direction shown in FIG. 1 is the longitudinal direction of the water collecting pipe 6. The y-axis direction is a direction that is perpendicular to the longitudinal direction of the water collecting pipe 6.

In the spiral-type separation membrane element 1, supply water 7 is usually supplied from one side surface and is gradually separated into permeate 8 and concentrate 9 while flowing parallel with the water collecting pipe 6. The permeate 8 goes out of the spiral-type separation membrane element 1 from a side surface that is opposite to the side surface to which the supply water 7 is supplied.

This type has a feature that since supply water 7 flows from the one side surface to the other side surface of the spiral-type separation membrane element 1, it is necessarily brought into contact with the membranes over a long distance and hence is separated into permeate 8 and concentrate 9 sufficiently. Whereas there are various types of separation membrane elements, they have a common feature that supply water is supplied to one surface of separation membranes and permeate is obtained from the other surface. Separation membrane elements other than a spiral-type one having various shapes and using flat membranes, such as a plate-and-frame type and a flat membranes accumulation type, can be employed as a separation membrane element of the invention according to respective uses and purposes.

<Supply-Side Channel>
(Supply-Side Channel Member)

Figure 2:
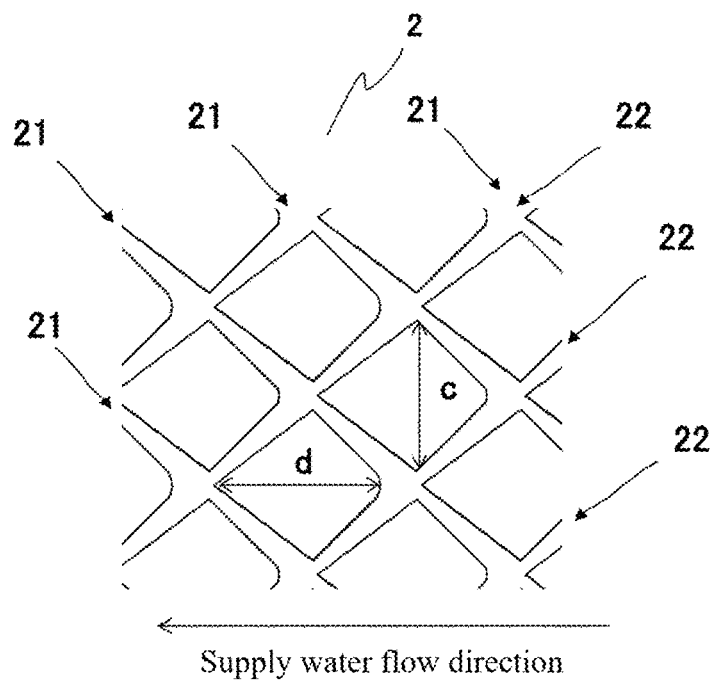
FIG. 2 is a plan view showing an example supply-side channel member employed in the invention.

As shown in FIG. 2, each supply-side channel member employed in the embodiment has a net shape in which plural fibrous rows X including fibrous objects A (21) and arranged in one direction and plural fibrous rows Y including fibrous objects B (22) and arranged in a different direction than the fibrous rows X sterically cross each other to form intersections at plural positions.

To suppress concentration polarization occurring on the separation membrane surfaces in the separation membrane element, it is important to decrease the number of positions where supply water stays, that is, clogged positions in supply-side channel and increase the degree of turbulence around the fibrous objects. This is because turbulence enables supply, to the surface of a separation membrane, of supply water that is not in contact with the membrane yet.

Since supply water flows while expanding between the fibrous objects of each supply-side channel member, fibrous objects that are not parallel with the flow direction of the supply water become obstacles to the flow of the supply water and play a role of increasing the degree of turbulence. On the other hand, the fibrous objects that are not parallel with the flow direction of the supply water tend to increase the flow resistance because they clog the channel and obstructs the flow of the supply water. In view of the above, in a longitudinal cross section including an arbitrary fibrous row and taken along the longitudinal direction of the arbitrary fibrous row, at least one of the fibrous object A and the fibrous object B is formed by a thread that is thinner at a central portion between intersection portions of a fibrous row X and a fibrous row Y than the intersection portions. As a result, the balance between the turbulence intensity and the flow resistance can be improved.

In the separation membrane element, since the permeation drive power is a transmembrane pressure difference, to increase the water production rate it is effective to increase the transmembrane pressure difference. The transmembrane pressure difference is obtained by subtracting the flow resistance and the osmotic pressure from the pressure applied to the separation membrane element. Thus, to increase the transmembrane pressure difference, it is necessary to increase the applied pressure, decrease the flow resistance, or decrease the membrane osmotic pressure. Where the applied pressure is kept the same, the water production rate can be increased by decreasing the flow resistance or the membrane osmotic pressure.

The porosity of the supply-side channel members has a great influence on the flow resistance. If the porosity is increased, the number of positions of obstacles to fluid decreases and hence the flow resistance lowers. If the porosity is decreased, the number of positions of obstacles to fluid increases and hence the flow resistance increases. However, if the porosity is increased to lower the flow resistance, the amount of resin or the like that is part of the supply-side channel members decreases and hence the stiffness of the supply-side channel members decreases. For example, a net in which threads are narrow between the intersections and has positions of necking (i.e., a phenomenon that when a polymer material is stretched it is not stretched uniformly and a constriction occurs locally after yielding) is advantageous in terms of the flow resistance because of a high porosity. However, such a net suffers stiffness reduction and is prone to expand and contract, possibly causing trouble, such as difficulty in cutting a net into prescribed dimensions and reduction in the ease of passage of the net through the device at the time of winding. Furthermore, reduction in the stiffness of the net may cause trouble such as slipping of the net during operation of the element.

In the embodiment, at least one of each of the fibrous objects A and each of the fibrous objects B has large diameter portions and small diameter portions that are arranged in its longitudinal direction and is composed of a fiber having tapered portions. The tapering will be described in a section "(fiber shape)" to be described later.

Since at least one of each of the fibrous objects A and each of the fibrous objects B is made of a tapered fiber, a suddenly contracted flow and a suddenly enlarged flow of fluid that are causes of increase in flow resistance can be suppressed and hence the flow resistance can be lowered while necessary stiffness of the supply-side channel members is maintained. Either one or both of each of the fibrous objects A and each of the fibrous objects B may be a tapered fiber.

The osmotic pressure increases as the concentration polarization occurring on the surface of a separation membrane becomes larger. In the separation membrane element, the concentration polarization becomes larger if the flow rate of supply water is low, fluid is separated from membrane surfaces, or fluid is less apt to flow in front of and behind fibers. That is, increasing the membrane surface velocity or decreasing the number of fibers that are in contact with the membrane surface is effective in suppressing the concentration polarization. Thus, if in a longitudinal cross section including an arbitrary fibrous row the fibrous object A or B is formed by a thread that is thinner at central portions between intersection portions of the fibrous row X and the fibrous row Y than at large diameter portions, or is tapered from one intersection to the adjacent one, the number of fibers that are in contact with the membrane surface of the separation membrane becomes smaller and increase of the concentration polarization can be suppressed. Furthermore, such a structure increases the porosity of the supply-side channel member and hence is effective in decreasing the flow resistance.

Figure 3:
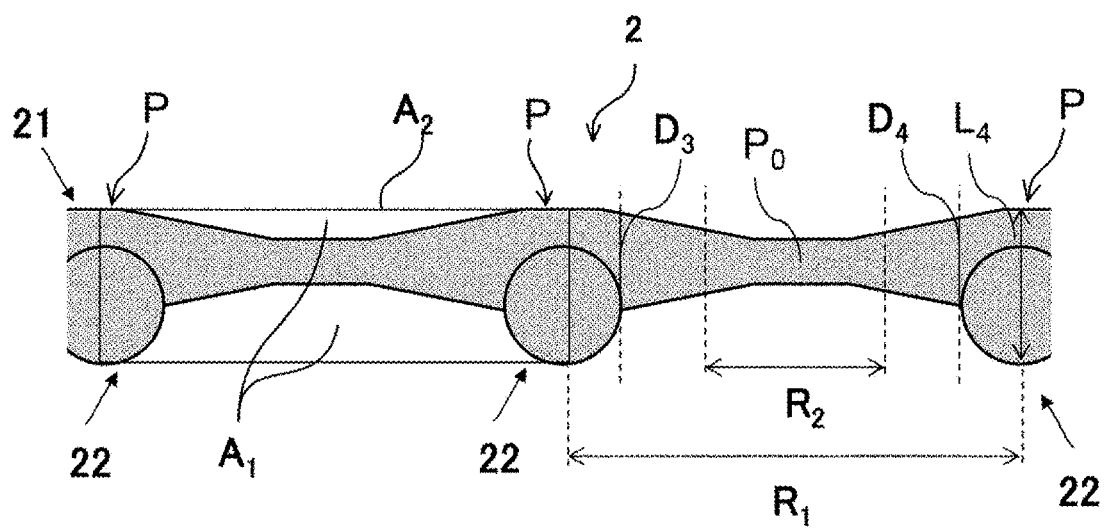
FIG. 3 is a sectional view showing an example supply-side channel member employed in the invention.

In the embodiment, in FIG. 3, in a longitudinal cross section including an arbitrary fibrous row of the fibrous object A or B and taken along its longitudinal direction, as indicated by symbol $R_2$, the central portion between intersection portions of a fibrous row X and a fibrous row Y means a range of 30% or more to 70% or less as the position goes from one intersection point P to the other intersection point P when the distance $R_1$ between the two adjoining intersection portions P is divided into 10 equal parts, that is, a range between points that are distant from the center $P_0$ between the intersection portions P by 20%.

(Fiber Shape)

The term "tapering" used in the embodiment means that a fiber between an intersection formed by a fibrous object A and a fibrous object B and an adjoining intersection increases in diameter from one intersection to the other, more specifically, the fiber increases or decreases in diameter as the position goes toward its tip. Here, for the sake of convenience, the shape of a tapered fiber will be called a "tapered shape", the shape of a fiber that is not tapered and has a uniform diameter will be called a "cylindrical shape," and the shape of a fiber that is thin between intersections and has a necking will be called a "necked shape." For example, the shape of a fiber between intersections of a fibrous row of each of supply-side channel members 2a-2c shown in FIG. 4A to FIG. 4C is called a tapered shape, the shape of a fiber between intersections of a fibrous row of a supply-side channel member 2d shown in FIG. 5A is called a cylindrical shape, and the shape of a fiber between intersections of a fibrous row of a supply-side channel member 2e shown in FIG. 5B is called a necked shape.

Figure 4A:
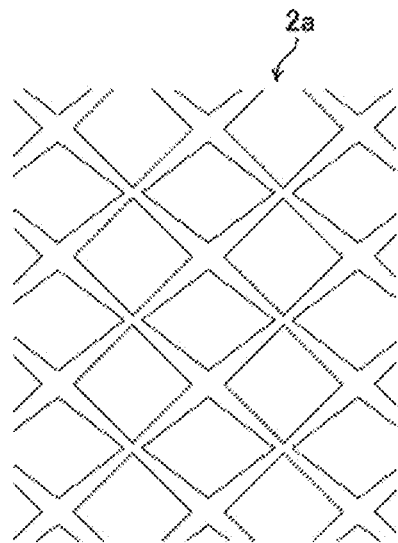
FIG. 4A to FIG. 4C are plan views showing example supply-side channel members employed in the invention.

As shown in FIG. 4A, it suffices that the diameter of a fiber decrease as the position goes from one intersection to the other when it is observed from a direction that is perpendicular to the plane of the supply-side channel members 2a. The tapered shape can suppress separation of fluid from the thread and thereby decreases the flow resistance. It is preferable that as shown in FIG. 4B and FIG. 4C a fiber may be tapered in a predetermined direction, more specifically, from the side of supply water (raw water) to the side of concentrate. This shape can suppress separation of fluid from the thread, prevent a suddenly contracted flow and a suddenly enlarged flow of fluid, and lower the flow resistance.

Figure 4B:
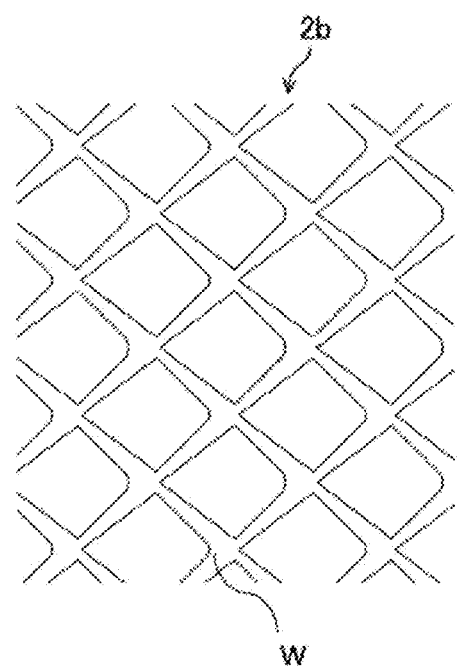
Figure 4C:
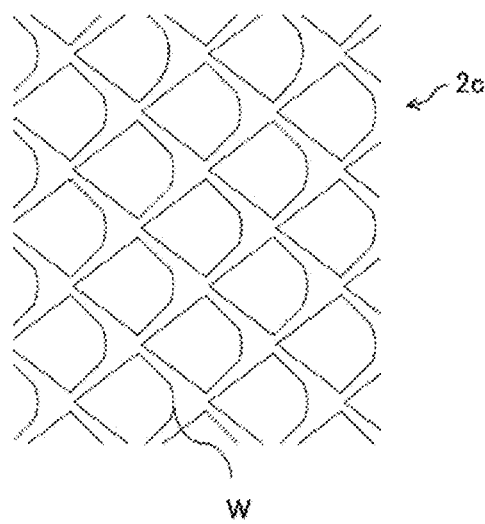
Figure 5A:
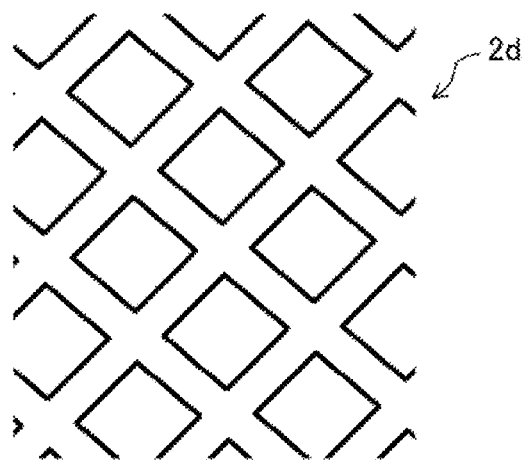
FIG. 5A and FIG. 5B are plan views showing example supply-side channel members that are not employed in the invention.
Figure 5B:
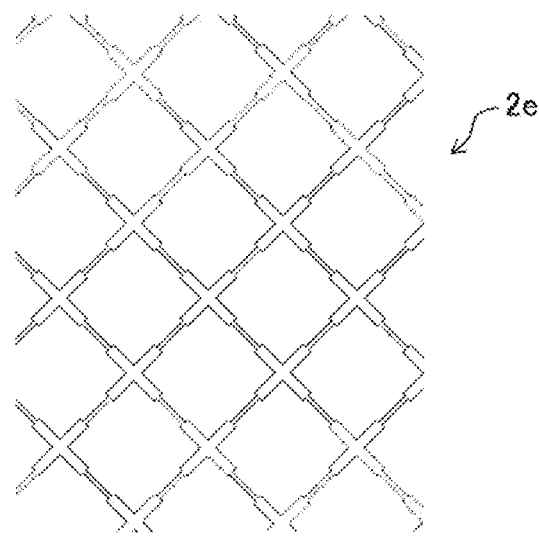

It is also preferable that when a surface of the supply-side channel member is observed it is found that each fiber overlap portion may be formed with a web portion w as shown in FIG. 4B and FIG. 4C. The term "web portion" means a portion that is formed when large diameter portions of tapered fibers overlap with each other and is wider than fiber central portions in a plan view. Where web portions w are formed in the supply-side channel member, the strength of each intersection is increased and the stiffness of the entire net is increased, whereby the handling during winding (e.g., cutting into prescribed dimensions and passage through the device) is made easier and the net is made less prone to slip out of place in a long-term operation.

Where fibers have a tapered shape, the amount of resin at each intersection point is made larger than in fibers having a cylindrical shape or a necked shape and intersection portions are wider and gentler in outline shape than central portions, as a result of which the membrane is less prone to be hurt and the removal rate is less prone to decrease.

Where fibers have a necked shape, the proportion of portions that are small in thread diameter is large, the supply-side channel area ratio can be increased easily, the porosity of the supply-side channel member is made large, and the flow resistance can be lowered. However, when comparison is made with a tapered shape having the same channel area ratio, in the case of a necked shape the channel expands or contracts rapidly at the necking portion and an energy loss occurs and the differential pressure tends to become large. Furthermore, in the case of a necked shape, in many cases the thread diameter is small and hence the stiffness tends to be low.

(Measurement of Thread Diameter of Intersection Portions and Central Portions)

In a longitudinal cross section of one fibrous row taken along its longitudinal direction, in FIG. 3 the thickness $L_4$ of an intersection portion P where two threads overlap with each other is a thread diameter of the intersection portion and the average thickness $L_5$ of a central portion $R_2$ located between intersection portions is a thread diameter of the central portion.

In the embodiment, it is preferable that the thread diameter (average thickness $L_5$) of the central portion $R_2$ may be larger than or equal to 0.10 mm and smaller than or equal to 0.75 mm, even preferably larger than or equal to 0.15 mm and smaller than or equal to 0.50 mm and further preferably larger than or equal to 0.20 mm and smaller than or equal to 0.40 mm. If the thread diameter of the central portion $R_2$ is in this range, even in decreasing the thickness of the supply-side channel member the concentration polarization can be suppressed while the flow resistance of the supply-side channel is lowered, whereby the salt rejection rate and the water productivity of the separation membrane element can be increased.

Thread diameters (thicknesses) of intersection portions and central portions can be determined by observing a longitudinal cross section that is parallel with a fibrous row using a microscope or an X-ray CT measuring instrument on the market and measuring distances. This may be done by measuring diameters of 30 arbitrary intersection portions or central portions using a measurement mode and calculating their average.

(Thickness of Supply-Side Channel Member)

The thickness of the supply-side channel member substantially corresponds to the thickness $L_4$ of intersection portion of the fibrous object A (21) and the fibrous object B (22), that is, the sum of the thickness of a fibrous object A (21) there and the thickness of a fibrous object B (22) there. As shown in FIG. 3, a fibrous row X and a fibrous row Y are partially fused together at an intersection portion.

In the embodiment, it is preferable that the average thickness of the supply-side channel member may be larger than or equal to 0.20 mm and smaller than or equal to 1.5 mm, even preferably larger than or equal to 0.30 mm and smaller than or equal to 0.85 mm and further preferably larger than or equal to 0.50 mm and smaller than or equal to 0.80 mm. If the average thickness of the supply-side channel member is in this range, the membrane surface linear velocity of supply water becomes high and a flow adjacent to the membrane surface is disordered, whereby a concentration polarization layer occurring on the membrane surface becomes thinner and hence the separation performance of the element can be increased. Furthermore, the clogging of the supply-side channel by foulants such as impurities in supply water and microbes can be suppressed and stable operation of the separation membrane element is enabled for a long time without need for increasing the necessary motive power of a pump.

Furthermore, in the invention, it is preferable that the ratio, $L_5/L_4$, of the average thickness $L_5$ of central portions to the thickness $L_4$ of intersection portions may be larger than or equal to 0.2 and smaller than or equal to 0.55, even preferably larger than or equal to 0.25 and smaller than or equal to 0.50. If the ratio of the thread diameter of central portions to that of intersection portions is in this range, the supply-side channel area ratio can be increased and a sufficiently wide supply-side channel can be secured inside the separation membrane element.

An average thickness of the supply-side channel member is an average of thickness values of randomly selected 10 or more intersection portions of fibrous objects A and fibrous objects B, namely sum of thickness values of a fibrous object A and a fibrous object B, as measured by a microscope, an X-ray CT measuring instrument, a precise thickness gauge, or the like and calculated according to (sum of measurement values)/(the number of measurement positions).

Still further, it is preferable that the thickness variation of the supply-side channel member may be 0.9 times or more and 1.1 times or less of an average thickness of the supply-side channel member. If the thickness variation of the supply-side channel member is in this range, supply water can be supplied to the separation membrane element uniformly and hence the performance of the separation membrane is allowed to manifest uniformly.

(Supply-Side Channel Area Ratio)

In the embodiment, the supply-side channel area ratio in a longitudinal cross section, taken along longitudinal direction of one fibrous row is in a range of 45% to 65%. As shown in FIG. 3, the supply-side channel area ratio (%) is given by $A_1/A_2 \times 100$ where $A_1$ is the average area of the entire space within the thickness of intersection portions in a longitudinal cross section taken along longitudinal direction of a fibrous row and $A_2$ is the average area within the thickness of intersection portions between two adjacent intersection portions in the longitudinal cross section. If the supply-side channel area ratio is larger than or equal to 45%, the flow resistance tends to be low and the pressure loss tends to decrease. If the supply-side channel area ratio is larger than or equal to 65%, due to resulting reduction in stiffness the handling performance may be lowered as exemplified by reduction in the ease of passage of a net through the device and difficulty in cutting the net into prescribed dimensions or resulting reduction in the flow rate of supply water may cause increase of the concentration polarization occurring on the membrane surface to reduce the salt rejection rate or the water production rate of the separation membrane element, though the seriousness of these problems depends on the net material and the interval between intersection portions.

An average of supply-side channel area ratios measured at arbitrary 30 positions can be employed as a supply-side channel area ratio.

(Void Volume v of Supply-Side Channel Member)

The void volume of the supply-side channel member employed in the embodiment is the volume of portions, capable of constituting the supply-side channel, of the supply-side channel member. A void volume v of the supply-side channel member can be determined by calculating a volume of a supply-side channel member main body by dividing a weight of the supply-side channel member per a cut-out area (e.g., 30 cm×30 cm) by a specific gravity of the material of the supply-side channel member material and subtracting the calculated volume of the supply-side channel member main body from a total volume V that is represented by the product of the thickness of the supply-side channel member and the cut-out area of the supply-side channel member.

In the embodiment, it is preferable that the proportion of the void volume v of the supply-side channel member may be in a range of 90% to 97%. If the void volume v of the supply-side channel member is in this range, the separation membrane element is improved in the balance between the turbulence intensity and the flow resistance of supply water without lowering the handling performance of the supply-side channel member.

(Supply-Side Channel Volume F of Separation Membrane Element)

The supply-side channel volume of the separation membrane element according to the embodiment is a volume of a portion that can be a supply-side channel formed by the supply-side channel member that is set between two planar portions of separation membranes in a separation membrane element manufactured by using the supply-side channel member. It is preferable that the ratio of the supply-side channel volume F of the separation membrane element to the void volume v of the supply-side channel member may be larger than or equal to 90%. If the ratio of the supply-side channel volume F of the separation membrane element to the void volume v of the supply-side channel member is larger than or equal to 90%, a sufficiently large supply-side channel can be secured in the separation membrane element and the pressure loss due to a flow of supply water can be reduced.

It is preferable to measure a void volume v of the supply-side channel member in such a manner that an X-ray CT measuring instrument shoots in a state that the separation membrane element is not broken, that is, influence of membrane deformation that occurred at the time of manufacture of the separation membrane element is reflected. However, where the size of the separation membrane element is so large that non-destructive shooting is difficult, a method can be employed that the separation membrane element is cut into plural parts having measurable sizes as appropriate and portions that are free of influence of the cutting are shot in the same manner. A sectional image is obtained by an X-ray CT measurement in a state that the supply-side channel member is set between two surfaces of separation membranes and a volume F of the supply-side channel that is actually formed inside the separation membrane element is calculated by performing image analysis on the thus-obtained cross-section image. A cut-out area at the time of image analysis is the same as at the time of measurement of a void volume v of the supply-side channel member.

(Interval Between Intersection Portions)

In the embodiment, it is preferable that the interval c shown in FIG. 2 between intersection portions (the pitch of intersection portions) in the direction that is perpendicular to the supply water flow direction (raw water flow direction) of the supply-side channel member 2 may be in a range of 3 to 5 mm, even preferably in a range of 3.5 to 4.5 mm. If the interval c between intersection portions in the direction that is perpendicular to the supply water flow direction of the supply-side channel member is in this range, a phenomenon that a separation membrane falls into a void portion of the supply-side channel member during manufacture of the separation membrane element can be suppressed and, in particular, channels adjacent to the supply water inflow end surface portion can be formed stably.

It is preferable that the interval d between intersection portions in the direction that is parallel with the supply water flow direction of the supply-side channel member may be in a range of 4 to 8 mm, even preferably in a range of 4.5 to 6.0 mm. If the interval d between intersection portions in the direction that is parallel with the supply water flow direction of the supply-side channel member is in this range, the turbulence intensity and the flow resistance of supply water can be balanced and hence the salt rejection rate and the water productivity of the separation membrane element can be increased.

As for a method for measuring an interval between intersection portions, it can be measured by observing the supply-side channel member from above in the thickness direction (i.e., from above a surface of the supply-side channel member) and measuring a distance with a microscope, for example.

(Angle Between Supply Water Flow Direction and Fibrous Objects)

When a surface of the supply-side channel member is observed, the flow resistance tends to increase as the angle between the supply water flow direction (i.e., the longitudinal direction of the water collecting pipe) and the fibrous objects increases though the turbulence intensity becomes higher. Therefore, this angle is preferably larger than or equal to 15° and smaller than or equal to 50°, and more preferably larger than or equal to 30° and smaller than or equal to 45°.

(Proportion of Area of Contact of Supply-Side Channel Member to Separation Membrane)

In the embodiment, it is preferable that the proportion of the area of contact of the supply-side channel member to a separation membrane may be in a range of 0.05 to 0.2, even preferably in a range of 0.1 to 0.15. If the proportion of the area of contact of the supply-side channel member to a separation membrane is in this range, supply water stagnation portions on the surface of the separation membrane can be made smaller and supply water can be supplied to the surface of the separation membrane efficiently. Thus, the turbidity removability during operation can be increased. In particular, trouble such as formation of scale can be suppressed even in the case of a high recovery rate operation.

Example methods that can be employed to set the proportion of the area of contact of the supply-side channel member to the separation membrane in the range of 0.05 to 0.2 are a method of using a net that is small in the proportion of the area of contact, to each separation membrane, of a supply-side channel member that is formed by stretch forming which will be described later so that it has regions having different thread diameters in each fibrous object between intersection portions while the thickness is kept the same in the intersection portions, and a method of manufacturing a separation membrane element by adjusting the pressure employed at the time of winding separation membrane leaves in each of which a supply-side channel member is sandwiched on a water collecting pipe together with permeation-side channel members so that the proportion of the area of contact of the supply-side channel member falls within the above range.

Example methods for measuring a proportion of the area of contact of the supply-side channel member to the separation membrane are a method of calculating it by disassembling the separation membrane element and cutting out a portion measuring 5 cm×5 cm from a separation membrane, observing that portion of the separation membrane with a microscope from above in its thickness direction, and dividing the area of marks formed by pressing the supply-side channel member against the separation membrane at the time of manufacture of the separation membrane element by the cut-out area, and a method of manufacturing a separation membrane element in such a manner that pressure-sensitive paper is sandwiched between a supply-side channel member and a separation membrane, recovering the pressure-sensitive paper after disassembling the separation membrane, and calculating a proportion of the area of contact of the supply-side channel member to each separation membrane by an image analysis in which colored portions of the pressure-sensitive paper are regarded as portions of contact of the supply-side channel member to the separation membrane.

(Intersections of Fibrous Rows)

Figure 6:
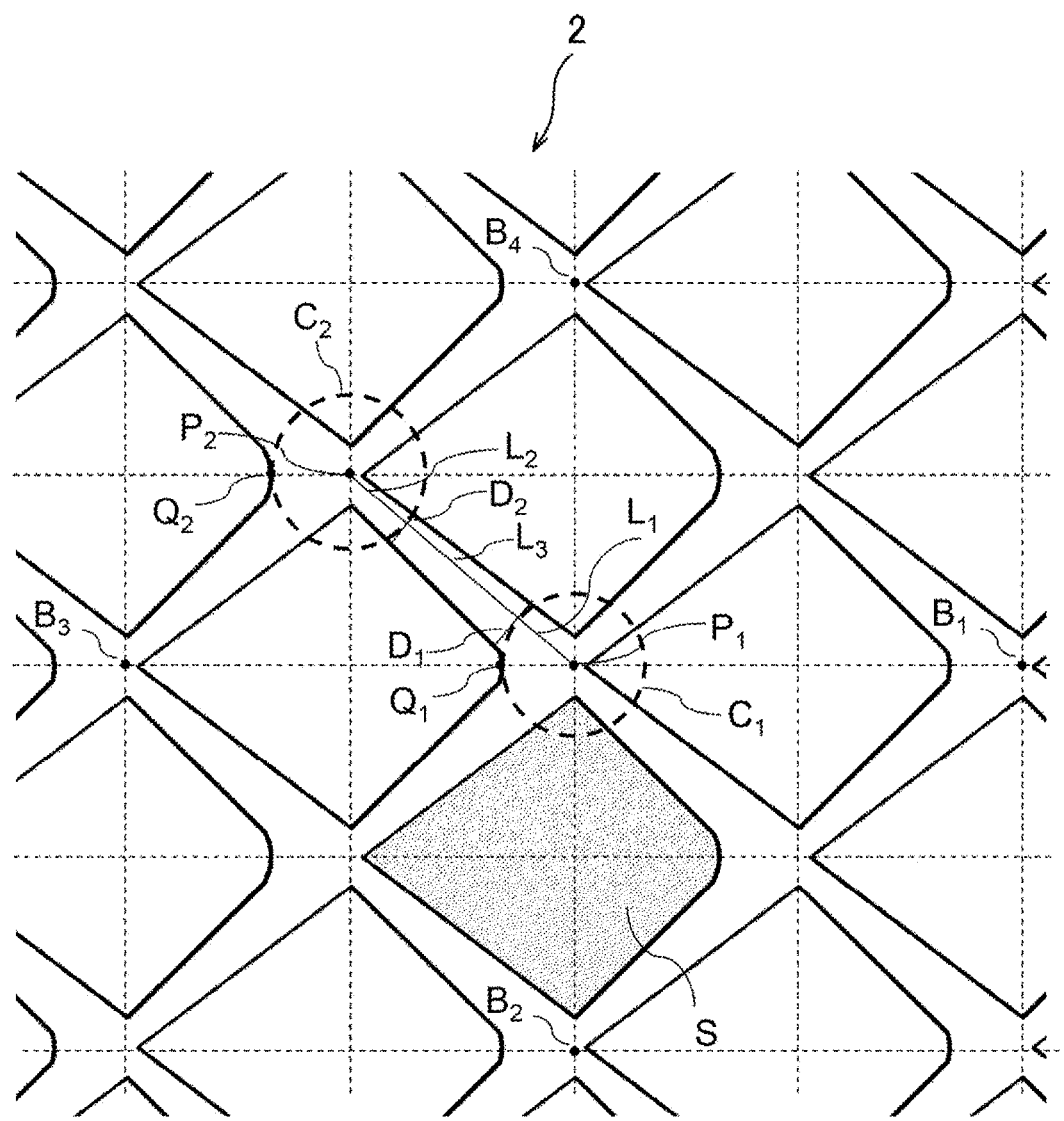
FIG. 6 is a plan view showing an example supply-side channel member employed in the invention.

As shown in FIG. 6 that is a view obtained when a surface of the supply-side channel member 2 is observed. Connect, by a straight line, each pair of diagonal corners of each of polygons S that are formed by fibrous rows X and fibrous rows Y. The intersection of a fibrous row X and a fibrous row Y is defined as a position where two straight lines intersect each other and a fiber exists. Even an intersection having curvature is regarded as a diagonal.

(Taper Ratio)

As shown in FIG. 6, four intersections that are located on extensions of straight lines that determine an intersection $P_1$ of arbitrary fibers and are closest to the intersection $P_1$ are denoted by $B_1$-$B_4$, respectively. Among points where line segments $P_1B_1$ to $P_1B_4$ intersect the outlines of the fibers, a point $Q_1$ having a longest distance to $P_1$ is selected and the length of a line segment $P_1Q_1$ is represented by $L_1$. A point $Q_2$ is determined by performing, for an arbitrary intersection $P_2$ adjacent to the point $P_1$, the same manipulations as performed above for the intersection $P_1$ and the length of a line segment $P_2Q_2$ is represented by $L_2$. Circles $C_1$ and $C_2$ having $L_1$ and $L_2$ as radii, respectively, are drawn and a length obtained by subtracting $L_1$ and $L_2$ from the length of the line segment connecting the intersections $P_1$ and $P_2$ is represented by $L_3$. Tangential lines, perpendicular to the line segment $P_1 P_2$ and intersecting the line segment $P_1 P_2$, to the respective circles $C_1$ and $C_2$ are drawn and thread diameters that are obtained by these tangential lines are denoted by $D_1$ and $D_2$, respectively. The taper ratio T is defined as follows:

$$\text{(Taper ratio } T)=|(D_1-D_2)/L_3| \qquad \text{[Formula 1]}$$

It is preferable that the taper ratio may be in a range of ½0 to ⅓, even preferably ⅟15 to ¼. If the taper ratio is in this range, fluid separation from the threads can be suppressed, a suddenly contracted flow and a suddenly enlarged flow of fluid can be prevented, and the flow resistance can be lowered. If the taper ratio is larger than ⅓, since the taper ratio is too large, the intersection portions are so large as to increase the flow resistance. Furthermore, the area of contact to a membrane surface becomes so large to produce a tendency that the amount of sticking of scale increases.

(Side-View Shape of Fibers)

Figure 7A:
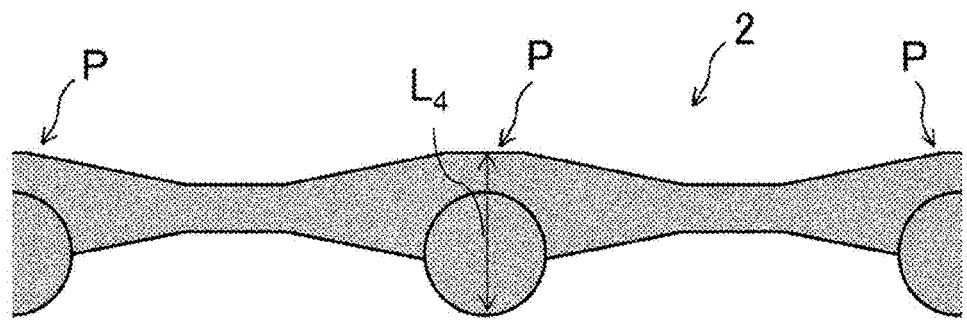
FIG. 7A and FIG. 7B are sectional views showing example supply-side channel members employed in the invention.
Figure 7B:
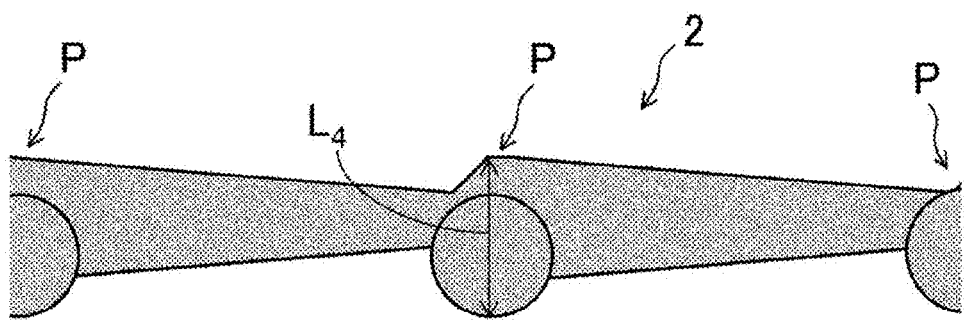
Figure 8:
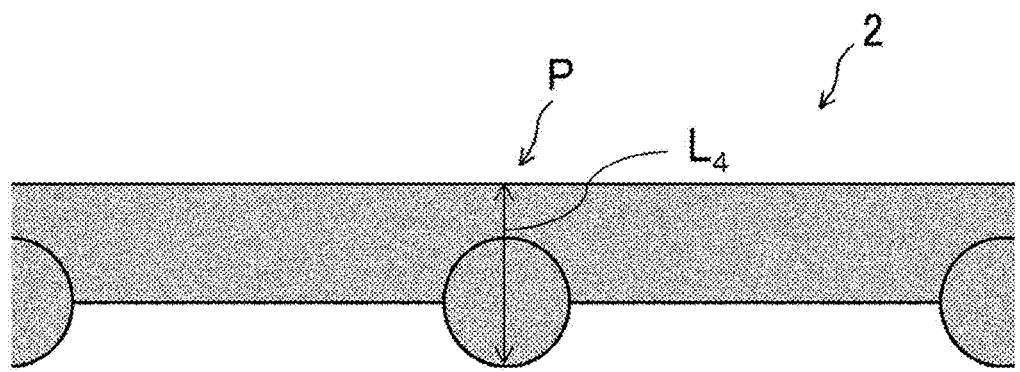
FIG. 8 is a sectional view showing an example supply-side channel member that is not employed in the invention.
Figure 9A:
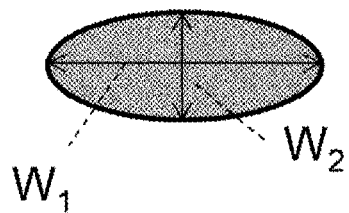
FIG. 9A to FIG. 9D are views showing example cross sections obtained by cutting a fibrous object that constitutes the supply-side channel member employed in the invention.
Figure 9B:
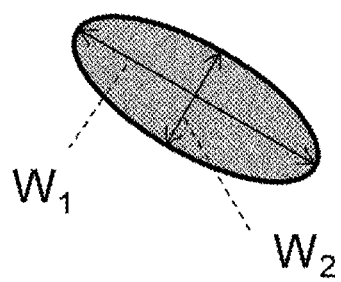
Figure 9C:
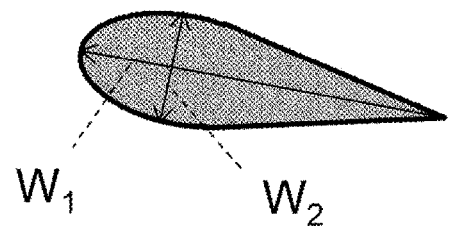
Figure 9D:
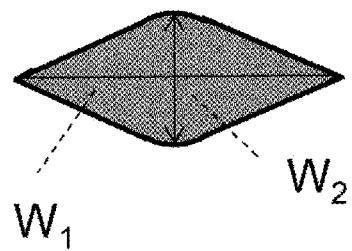

When the supply-side channel member 2 is observed from a direction that is parallel with its plane and perpendicular to an arbitrary fibrous object A or B, the fibrous object A or B may be tapered in the direction from one intersection portion P to the other intersection portion P as shown in FIG. 7B or the thread diameter may be small at a central portion between intersection portions P as shown in FIG. 7A. For the sake of convenience, the shape shown in FIG. 7A is referred to as a "different-diameter shape" and the shape shown in FIG. 7B is referred to as a "tapered shape." As shown in FIG. 8, such a shape that the thread diameter does not decrease between intersections is referred to as a "cylindrical shape". As for the term "large diameter portion" as used in the invention, when a side surface of, for example, the fibrous object A (21) among a fibrous object A (21) and fibrous objects B (22) shown in FIG. 3 is observed, a large diameter portion $D_3$ and a large diameter portion $D_4$ are indicated by two respective line segments that pass through the fibrous object A tangential to cross sections, taken perpendicularly to the plane of the supply-side channel member, of a fibrous object B and an adjacent fibrous object B'. It suffices that a central portion $R_2$ may be made of fiber that is thinner than either one of the large diameter portions $D_3$ and $D_4$. It is preferable that the ratio (thread diameter of central portion)/(thread diameter of large diameter portion) may be in a range of 0.9 to 0.2, even preferably in a range of 0.8 to 0.3. The side-view shape may be any shape as long as the ratio (thread diameter of central portion)/(thread diameter of large diameter portion) is in this range; FIG. 7A and FIG. 7B show examples of such a side-view shape. Sticking of dirt substances and scale to the membrane surfaces can be suppressed while the void ratio of the supply-side channel member is increased and the pressure loss is decreased.

(Side-View Shape of Fibers of Supply-Side Channel Member)

As shown in FIG. 9A to FIG. 9D, it is preferable that the sectional shape of the fibers of the supply-side channel member may be a flat shape or a streamline shape. The sectional shape of the fibers of the supply-side channel member may be a shape that lacks a part of each of these figures.

It is preferable that the flat shape may be such that in a transverse cross section Z taken perpendicularly to the longitudinal direction of an arbitrary fibrous object of the supply-side channel member, a maximum diameter $W_1$ of the fibrous object and a maximum diameter $W_2$ in the direction perpendicular to the direction of the maximum diameter $W_1$ satisfy a relationship $1.2 < W_1/W_2 < 3.0$. It is even preferable that the ratio $W_1/W_2$ may be in a range of 1.5 to 2.5. If the ratio $W_1/W_2$ is in the above range, since the intersection portions are gentle in shape, damaging of the membrane surfaces by a long-term operation can be suppressed. Furthermore, if the ratio $W_1/W_2$ is in the above range, since the channels formed between the supply-side channel member and the membranes expand or contract gently, the separation of fluid from the membrane surfaces and increase of the concentration polarization of dissolved salts can be suppressed Each of the maximum fiber diameter $W_1$ and the maximum fiber diameter $W_2$ in the direction perpendicular to the direction of the maximum fiber diameter $W_1$ is an average of measured values obtained by observing 10 or more randomly selected transverse cross sections taken perpendicularly to the longitudinal direction of an arbitrary fibrous object with a microscope, an X-ray CT measuring instrument, or the like and can be calculated according to (sum of measurement values)/(number of measurement positions).

(Inclination Angle of Fiber of Supply-Side Channel Member)

Figure 10:
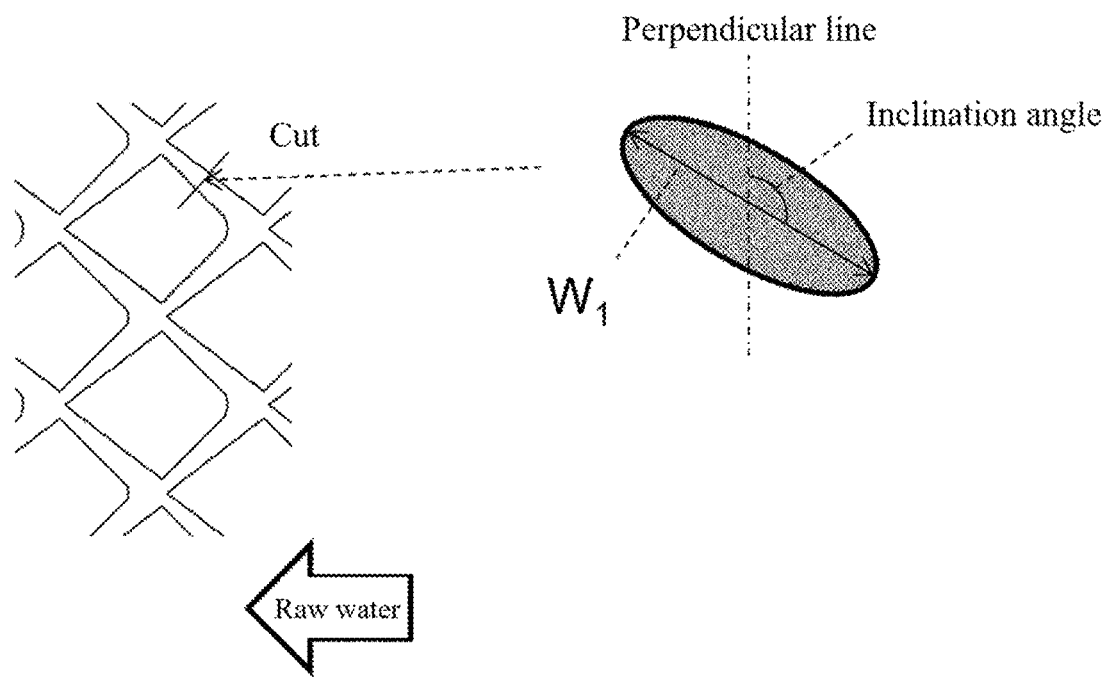
FIG. 10 shows an example cross section obtained by cutting a fibrous object that constitutes the supply-side channel member employed in the invention.

The inclination angle of a cross section of a fiber of the supply-side channel member is defined as follows. As shown in FIG. 10, when a transverse cross section of the supply-side channel member is observed in the direction from the raw water (supply water) side to the concentrate side, draw a perpendicular line in a direction that is parallel with the transverse cross section of the supply-side channel member and perpendicular to the supply-side channel member. An inclination angle is defined as an angle that is formed in the clockwise direction by the direction of the maximum diameter $W_1$ of the arbitrary fibrous object and the above perpendicular line. For example, where the direction of the maximum diameter $W_1$ is inclined perpendicularly to the perpendicular line, the inclination angle is 90°. It is preferable that the inclination angle may be in a range of 10° to 170°, even preferably in a range of 30° to 150°. If the inclination angle is in this range, separation of fluid from the membrane surfaces can be suppressed while suppressing pressure loss. The most suitable inclination angle of a fiber can be set on the basis of the balance between the differential pressure and separation of fluid from the membrane surfaces.

An inclination angle is obtained as an average of measured values obtained by observing 10 or more randomly selected transverse cross sections taken perpendicularly to the longitudinal direction of an arbitrary fibrous object with a microscope, an X-ray CT measuring instrument, or the like and can be calculated according to (sum of measurement values)/(number of measurement positions).

(Unit Weight of Supply-Side Channel Member)

It is preferable that the unit weight of the supply-side channel member may be in a range of 15 to 120 g/m². If the unit weight is in this range, the balance between the flow resistance and the sticking-out and slipping of the net during a long-term operation of the element is excellent and the element performance can thus be increased.

A unit weight of the supply-side channel member can be calculated according to (sum of measurement values)/(number of measured pieces) by measuring weights of at least five 1 m×1 m pieces that are cut out of the supply-side channel member.

It is preferable that the variation of unit weights of supply-side channel members may be 0.9 times or more and 1.1 times or less of an average unit weight of the supply-side channel members. If the variation of unit weights of supply-side channel members is in this range, supply water can be supplied uniformly to the separation membrane element and hence the performance of the separation membrane can be exhibited uniformly.

(Bending Resistance of Supply-Side Channel Member)

It is preferable that the bending resistance of the supply-side channel member may be in a range of 0.07 m to 0.14 m. If the bending resistance of the supply-side channel member is 0.07 m or larger, the handling performance of the supply-side channel member such as insertion into the device and cutting into prescribed dimensions tend to increase. If the bending resistance of the supply-side channel member exceeds 0.14 m, in the spiral-type separation membrane element, when the separation membrane unit is wound, the separation membranes are prone to be scratched by being rubbed by end portions of the supply-side channel members in a region close to the water collecting pipe where the radius of curvature is large. The bending resistance varies depending on the thickness or pitch of the supply-side channel member and the material of the supply-side channel member. A supply-side channel member that is high in handling performance can be manufactured by combining these factors properly. The bending resistance becomes smaller than 0.07 m if the thickness of the supply-side channel member is too small or its pitch is too large. The bending resistance becomes larger than 0.14 m if the thickness of the supply-side channel member is too large or its pitch is too small.

Bending resistance of the supply-side channel member is measured according to the JIS standard L1096 (2010) 8.21 (45° cantilever method). More specifically, five test pieces measuring 20 mm×150 mm in the direction perpendicular to the longitudinal direction of the supply-side channel member and the direction parallel to it are prepared by cutting them out from flat parts without a curl of a supply-side channel member. The bending resistance is an average of values obtained by measuring, with a scale or the like, movement distances of test pieces when they are slid from a flat stage until their tips come into contact with a slope of 45°; the value can be calculated by (sum of the measurement values)/(the number of measured portions). If a test piece is curled, it is preferable to remove the curl by pushing the test piece for three hours or more by a force that is so weak that the test piece itself is not deformed.

(Material)

Although there are no particular limitations on the material of the supply-side channel member, from the viewpoint of forming property it is preferable that the supply-side channel member may be made of a thermoplastic resin; in particular, polyethylene and polypropylene are preferable because they are less prone to damage the surface of the separation membrane and inexpensive. In the supply-side channel member, the fibrous objects A and the fibrous objects B may be made of either the same material or different materials.

(Manufacturing Method)

As for the forming of a net-shaped supply-side channel member, in general, molten resin is supplied from an extruder while two inside and outside spinnerets in each of which many holes are arranged on two inside and outside circumferences are rotated in opposite directions and molten threads that are ejected from the inside and outside spinnerets are crossed when or immediately after they are output from the spinnerets, whereby a net-shaped structure is formed. At this stage, the net has a cylindrical shape. Then the cylindrical net is cooled and solidified, whereby a thickness, thread diameters, an interval between intersection portions are determined. Then the net is cut open and taken as a sheet-shaped net.

To manufacture, as in the embodiment, a supply-side channel member in which the intersection thickness is maintained and each fibrous object between intersection portions have a region where the fiber diameter varies and the fiber is tapered when a surface of the supply-side channel member is viewed, a method can be employed that resin is supplied from small spinnerets at a high resin discharge pressure, a jig whose diameter is larger than the inner diameter of a cylindrical net is caused to pass through the inside of the cylindrical net before the resin constituting the cylindrical net is cooled and solidified completely, and the cylindrical net is caused to be cooled and solidified while it is pulled in the width direction and the longitudinal direction simultaneously. A net that has been manufactured by causing the jig whose diameter is larger than the inner diameter of the cylindrical net to pass through inside of a cylindrical net before the resin constituting the cylindrical net is cooled and solidified completely has a feature that the thread diameter of each fibrous object decreases gently from an intersection portion to a central portion. To manufacture a supply-side channel member having a cylindrical shape in which each fibrous object between intersection portions is uniform in thread diameter, resin is supplied from spinnerets at a low resin discharge pressure, a jig whose diameter is larger than the inner diameter of a cylindrical net is caused to pass through inside of the cylindrical net before the resin constituting the cylindrical net is cooled and solidified completely, and the cylindrical net is caused to be cooled and solidified while it is pulled in the width direction and the longitudinal direction simultaneously at a ratio that is smaller than in the case of a supply-side channel member having a tapered fiber shape.

On the other hand, by employing a method that after a cylindrical net is caused to be cooled and solidified it is subjected to longitudinal stretching and lateral stretching in a heating furnace, a net can be manufactured in which a thread diameter of a fibrous object has a necked shape at a central portion with respect to an intersection portion. The difference between the two kinds of manufacturing methods can be recognized by observing a thread shape of a net.

Methods for manufacturing a net that is made up of threads in which the diameter is smaller at central portions between intersection portions of fibrous rows than at the intersection portions are not limited to the above methods. Such a net may be manufactured by a method in which fibrous objects between intersection portions are compression-deformed by embossing, imprinting, pressing etc., a method of casting molten resin into a die and taken out a resulting mold, a method using a 3D printer.

<Permeation-Side Channel>

(Permeation-Side Channel Member)

In the envelope-like membrane 5, the separation membranes 3 are laid on each other in such a manner than their permeation-side surfaces are opposed to each other, the permeation-side channel member 4 is set between these separation membranes 3, and the permeation-side channel member 4 constitutes the permeation-side channel. There are no limitations on the material of the permeation-side channel member; tricot, nonwoven fabric, a porous sheet to which projections are adhered, a film produced by concavo-convex forming and punching, and concavo-convex nonwoven fabric can be used. Projections that function as permeation-side channel members can be adhered to the permeation-side surface of each separation membrane.

Among the above materials, use of circular-knit tricot manufactured by a circular knitting machine is preferable in terms of improving the water production rate of the element because when a needle loop width and a sinker loop width are made approximately the same both kinds of loops can be used to form a channel; an optimum channel width determined by taking into consideration membrane falling during operation of the separation membrane element can be obtained uniformly; and a permeation-side channel member that is sufficient in pressure resistance and flow properties even if it is thin can be manufactured.

<Formation of Separation Membrane Leaf>

Each separation membrane leaf may be formed either by folding a separation membrane so that its permeation-side surface is located inside or laying two separate separation membranes so that their permeation-side surfaces are opposed to each other and sealing the separation membranes at their circumferences.

Example "sealing" methods are bonding by an adhesive, a hot-melt adhesive, or the like, fusion by heating, laser light, or the like, and insertion of a rubber sheet. Sealing by bonding is particularly preferable because it is simplest and highly effective.

<Use of Separation Membrane Element>

Separation membrane elements may be used as a separation membrane module by connecting them in series or parallel and housing a resulting assembly in a pressure container.

A fluid separation device can be constructed by combining the above separation membrane element or separation membrane module with a pump for supplying fluid to it, a device for preprocessing the fluid, etc. Use of such a separation device makes it possible to obtain water that is suitable for a purpose by, for example separating supply water into permeate such as drinking water and concentrate that has not permeated the membranes.

Taking into consideration the fact that as the manipulation pressure of the fluid separation device increases the removal rate increases but the energy necessary for operation also increases as well as the ease of maintenance of the supply-side channel and the permeation-side channel of the separation membrane element(s), it is preferable that the manipulation pressure in causing supply water to permeate the separation membrane module may be higher than or equal to 0.2 MPa and lower than or equal to 5 MPa.

Whereas the salt removal rate decreases as the temperature of supply water becomes higher, the membrane-permeation flux decreases as the temperature of supply water becomes lower. Thus, it is preferable that the temperature of supply water may be higher than or equal to 5° C. and lower than or equal to 45° C.

If the pH of raw water is in a neutral range, generation of scale such as magnesium is suppressed even if the raw water is a high salt-concentration liquid such as seawater and deterioration of the membranes can be suppressed.

(Supply Water)

There are no particular limitations on the supply water to be supplied to the separation membrane element according to the embodiment; the supply water may be preprocessed tap water or water containing a large amount of impurities such as seawater or brackish water. Where the separation membrane element according to the embodiment is used for, for example, water treatment, raw water (supply water) is, for example, a liquid mixture containing TDS (total dissolved solids) at 500 mg/L or higher and 100 g/L or lower, such as seawater, brackish water or drainage water. In general, the term "TDS" means a total amount of dissolved solids and is represented by "mass divided by volume" and may also be represented by "weight ratio" by regarding 1 L as weighing 1 kg. According to a definition, TDS can be calculated from a weight of residues obtained by evaporating a solution filtered by a 0.45-μm filter at 39.5° C. to 40.5° C. More simply, TDS is calculated through conversion from a practical salinity (S).

When separation membrane elements operate in a low range that the flow speed of a separation membrane surface crossing flow is lower than or equal to 10 cm/sec, in general, stagnant portions occur in front of and behind fibrous objects and cause reduction of the water production rate and the desalination rate due to increased membrane surface concentration polarization and scaling/fouling. Separation membrane elements including supply-side channel members whose supply-side channel area ratio is in a range of 45% to 65% are small in the number of stagnant portions formed in front of and behind fibrous objects and hence have features that the water production rate and the desalination rate are not prone to decrease and scaling and fouling are less likely to occur. Since permeate is pulled out in a front stage of a vessel including plural elements, the flow speed of a separation membrane surface crossing flow in the rear stage may become low. Thus, it is preferable to use the separation membrane element according to the invention in the rear stage of such a vessel.

As the supply-side channel member employed in the invention is made thinner, the flow speed of a crossing flow can be increased and hence the risk of occurrence of scaling and fouling can be lowered.

EXAMPLES

Although the invention will be described below in more detail using Examples, the invention is not restricted at all by these Examples.

(Measurement of Thread Diameters of Intersection Portion and Central Portion)

A longitudinal cross section taken parallel with a fibrous row of a net-shaped sample was observed at a magnification ×20 using a high-precision shape measuring system KS-1100 produced by Keyence Corporation and thread diameters of intersection portions and central portions were checked. More specifically, thread diameters of centers of 30 arbitrary intersection portions and thread diameters of 30 arbitrary central portions each of which exists in a region of 20% from the center of two adjacent intersection portions toward those intersection portions were measured and their averages were calculated.

(Thickness of Supply-Side Channel Member)

A longitudinal cross section taken parallel with a fibrous row of a net-shaped sample was observed at a magnification ×20 using the high-precision shape measuring system KS-1100 produced by Keyence Corporation, and thicknesses of 30 arbitrary intersection portions and their average was calculated.

(Area Ratio of Supply-Side Channel)

A longitudinal cross section taken parallel with a fibrous row of the supply-side channel member was observed at a magnification ×20 using the high-precision shape measuring system KS-1100 produced by Keyence Corporation, and a distance between two adjacent intersection portions and a thickness of an intersection portion (a thickness of the supply-side channel member) were measured at 30 positions and their averages were calculated. An area between two adjacent intersection portions in the longitudinal cross section was calculated by multiplying the distance between two adjacent intersection portions by the thickness of an intersection portion.

Then an area of a space that is formed between two adjacent intersection portions was calculated by performing an image analysis on a longitudinal cross section image. The image analysis was performed for 30 arbitrary positions and an average thereof was calculated. An area ratio of the supply-side channel was calculated according to (average area of space in longitudinal cross section)/(average area between two adjacent intersection portions in longitudinal cross section)×100.

(Void Volume v of Supply-Side Channel Member)

A 30 cm×30 cm piece was cut out of a net-shaped sample and its weight was measured. A total volume was calculated by multiplying a thickness of the supply-side channel member by a cut-out area. Then a volume of a net-shaped sample main body was calculated by dividing the weight of the cut-out piece of the net-shaped sample by a specific weight of the material of the supply-side channel member and a void volume of the supply-side channel member was calculated by subtracting the volume of a net-shaped sample main body from the total volume.

(Supply-Side Channel Volume F of Separation Membrane Element)

The spiral-type separation membrane element was cut into a cylinder of 30 cm in length and it was shot with X-ray intensity of 100 kV using a 3D measurement X-ray CT instrument (TDM3000H-FP) produced by Yamato Scientific Co., Ltd. A volume (internal volume), per a cut-out area 30 cm×30 cm of a piece, which can become a supply-side channel, of a net-shaped sample interposed between two surfaces of separation membranes was calculated by an image analysis.

(Interval Between Intersection Portions)

A net-shaped sample was observed from above in the thickness direction at a magnification ×20 using high-precision shape measuring system KS-1100 produced by Keyence Corporation, and an interval between arbitrary intersection portions of the supply-side channel member in the direction perpendicular to the flow direction of supply water and an interval between arbitrary intersection portions of the supply-side channel member in the direction parallel with the flow direction of supply water were measured at 30 positions and their averages were calculated.

(Measurement of Taper Ratio)

A net-shaped sample was shot from a plane direction using high-precision shape measuring system KS-1100 produced by Keyence Corporation and drawing work was done on the image using PowerPoint. The corners of an arbitrary polygon S were connected using straight lines and an intersection $P_1$ was determined. Four intersections that were located on extensions of straight lines that determine the intersection $P_1$ and were closest to the intersection $P_1$ were denoted by $B_1$-$B_4$, respectively. Among points where line segments $P_1B_1$ to $P_1B_4$ intersected the outlines of the fibers, a point $Q_1$ having the longest distance to $P_1$ was selected and the length of a line segment $P_1Q_1$ was represented by $L_1$. A point $Q_2$ was determined by performing, for an arbitrary intersection $P_2$ adjacent to the point $P_1$, the same manipulations as performed above for the intersection $P_1$ and the length of a line segment $P_2Q_2$ was represented by $L_2$. Circles $C_1$ and $C_2$ having $L_1$ and $L_2$ as radii, respectively, were drawn and a length obtained by subtracting $L_1$ and $L_2$ from the length of the line segment connecting the intersections $P_1$ and $P_2$ was represented by $L_3$. Tangential lines, perpendicular to the line segment $P_1$ $P_2$ and intersecting the line segment $P_1$ $P_2$, to the respective circles $C_1$ and $C_2$ were drawn and thread diameters that are obtained by these tangential lines were denoted by $D_1$ and $D_2$, respectively. Lengths $L_1$-$L_3$, $D_1$, and $D_2$ were measured on the basis of the scale bars of an image obtained by the high-precision shape measuring system KS-1100 produced by Keyence Corporation and a taper ratio T was calculated according to the following equation. These manipulations and measurements were performed for 15 positions on each of the front and back surfaces of the supply-side channel member, for 30 positions in total, and an average of calculated taper ratios T was calculated.

$$(\text{Taper ratio } T) = |(D_1 - D_2)/L_3| \quad \text{[Formula 2]}$$

(Measurement about Large Diameter Portions)

One, made of a fiber having a smaller diameter, of fibrous object A and fibrous object B is selected. If the fibrous object A, for example, was selected, a net-shaped sample was frozen by liquid nitrogen and a fibrous object B was cut in a direction parallel with a fibrous object A in vicinity of the fibrous object A. Cross sections were observed from a direction that is parallel with the plane of the net-shaped sample and perpendicular to an arbitrary fibrous object A or B at a magnification ×20 using the high-precision shape measuring system KS-1100 produced by Keyence Corporation, whereby thread diameters of large diameter portions $D_3$ and $D_4$ were checked. More specifically, thread diameters of arbitrary large diameter portions $D_3$ and $D_4$ were measured and the thread diameter of one, having a larger thread diameter, of them was employed as a thread diameter of a large diameter portion. This manipulation was performed at a total of 30 positions and an average of resulting thread diameters was calculated.

(Sectional Shape of Fibers of Supply-Side Channel Member)

A net-shaped sample was frozen by liquid nitrogen and was cut in a direction that was perpendicular to the longitudinal direction of an arbitrary fibrous object. Its transverse cross section was observed from the perpendicular direction, whereby a maximum diameter $W_1$ of the transverse cross section and a maximum diameter $W_2$ in the direction perpendicular to the transverse cross section were measured using the high-precision shape measuring system KS-1100 manufactured by Keyence Corporation. The same manipulation was performed repeatedly at 15 positions of arbitrary fibrous objects A and B and averages of resulting sets of diameters were calculated, respectively.

(Inclination Angle of Fibers of Supply-Side Channel Member)

A net-shaped sample was frozen by liquid nitrogen and was cut in a direction that was perpendicular to the longitudinal direction of an arbitrary fibrous object. A transverse cross section was observed from a direction perpendicular to it using the high-precision shape measuring system KS-1100 produced by Keyence Corporation, whereby an angle formed, in the clockwise direction, by the vertical line and the direction of a maximum diameter $W_1$ of the transverse cross section was measured. The same manipulation was performed repeatedly at 15 positions of arbitrary fibrous objects A and B and an average of resulting angles was calculated.

(Unit Weight of Supply-Side Channel Member)

A net-shaped sample was cut into a 1.0 m×1.0 m piece. Weights of 10 such pieces were measured using an electronic scale and their average was calculated.

(Bending Resistance of Supply-Side Channel Member)

Bending resistance of the supply-side channel member was measured according to the JIS standard L1096 (2010) 8.21 (45° cantilever method). A net-shaped sample was cut into a piece measuring 20 mm×150 mm in each of a direction perpendicular to the longitudinal direction and a direction parallel with the longitudinal direction to prepare a test piece. If a test piece was curled, a plastic piece having the same size as the test piece was prepared and put on the test piece, a weight of 200 g was put on the plastic piece, and they were held as they were for 3 hours. Then an average of values obtained by measuring, with a scale, movement distances of five test pieces taken along each direction was calculated when they were slid from a horizontal stage at a constant speed until their tips come into contact with a slope of 45°.

(Proportion of Area of Contact of Supply-Side Channel Member to Separation Membrane)

A separation membrane element was produced in such a manner that pressure-sensitive paper (produced by FUJIFILM Corporation, two-sheet type, type name: PSC-LLLW, Prescale for ultra super low pressure) was sandwiched between a polypropylene net as a supply-side channel member and a separation membrane and the pressure-sensitive paper was collected later by disassembling the separation membrane. Colored portions of the pressure-sensitive paper were judged as portions of contact of the supply-side channel member to the separation membrane and a proportion of an area of contact of the supply-side channel member, per a cut-out portion having an area 5 cm×5 cm, to the separation membrane was calculated by an image analysis.

Examples (Manufacture of Supply-Side Channel Member P)

A cylindrical net having a net-shaped structure was formed using polypropylene as a material by supplying molten resin at a high discharge pressure from an extruder while two inside and outside spinnerets in each of which many holes were arranged were rotated in opposite directions. Furthermore, a method in which a jig whose diameter was larger than the inner diameter of the cylindrical net was caused to pass through inside of the cylindrical net before the resin constituting the cylindrical net was cooled and solidified completely and the cylindrical net was caused to be cooled and solidified while it was pulled in the width direction and the longitudinal direction simultaneously was employed, whereby each of supply-side channel members shown in Tables 1-5 was manufactured in which the thread diameter of each fibrous object gently decreased from intersection portions to a central portion. Structure controls were performed to finally obtain shapes of supply-side channel members shown in Tables 1-5 by changing the molten resin discharge pressure of the extruder, the dimensions of the jig to be caused to pass through the cylindrical net, and the taking speed.

(Manufacture of Spiral-Type Separation Membrane Element)

A porous support layer (thickness: 130 μm) roll formed by a fiber-reinforced polysulfone support membrane was manufactured by casting a DMF solution of 16.0 mass % polysulfone onto nonwoven fabric (fineness: 1 decitex, thickness: about 90 μm, aeration: 1 cc/cm$^2$/sec, density: 0.80 g/cm$^3$) formed by polyethyleneterephthalate fibers at room temperature (25° C.) to obtain a thickness 180 μm, immediately immersing it into pure water and leaving it as it was for 5 minutes, and then immersing it in hot water of 80° C. for 1 minute.

Then the surface of a layer, made of polysulfone, of the porous support membrane was immersed in an aqueous solution containing m-PDA at 5 mass % and ε-caprolactam at 1.0 mass % for 2 minutes and lifted up slowly in the vertical direction. Furthermore, an excessive aqueous solution was removed from the surface of the support membrane by blowing nitrogen over it from an air nozzle.

Subsequently, an n-decane solution containing trimesoyl chloride at 0.08 mass % was applied to the membrane to wet the membrane surface completely and this state was held still for 1 minute. Then an excessive solution was removed from the membrane by air blowing and the membrane was cleaned by hot water of 80° C. for 1 minute, whereby a composite separation membrane roll was obtained.

The thus-obtained separation membrane was subjected to folding cutting so as to have an effective area of 2.6 m$^2$ in a separation membrane element, and separation membrane leaves were produced by sandwiching a polypropylene net (thickness: 0.6 mm) shown in Table 1 to serve as a supply-side channel member.

Tricot (thickness: 0.26 mm) shown in Table 1 to serve as a permeation-side channel member was laid on a permeation-side surface of each of the thus-obtained separation membrane leaves, leaf adhesive was applied to the separation membrane leaves, and the separation membrane leaves were wound spirally on a water collecting pipe made of PVC (polyvinyl chloride) (width: 1,016 mm, diameter: 19 mm, number of holes: 23 on one straight line). After the outer circumferential surface of the wound body was fixed by a tape, the edges at the two respective ends were cut and end plates were attached. Thus, a separation membrane element of 2.5 inches in diameter was manufactured which was to be supplied with supply water from one side surface and discharge concentrate.

(Water Production Rate)

The separation membrane element was put into a pressure container and caused to operate for 30 minutes under conditions that the operation pressure was 0.5 MPa and the temperature was 25° C. using, as supply water, saline water of 200 ppm in concentration and an NaCl aqueous solution of pH 6.5. After that, sampling was performed for 1 minute and a permeation amount (in gallon) per day was employed as a water production rate (GPD (gallons/day). The collection rate was set at 8%.

(Removal Rate (TDS Removal Rate))

A TDS concentration in each of the supply water that was used in the operation of one minute in the measurement of a water production rate and the sampled permeate was determined by a conductance measurement and a TDS removal rate was calculated according to the following equation:

(TDS removal rate (%))=100×[1−{(TDS concentration in permeate)/(TDS concentration in supply water)}].

(Element Differential Pressure)

An element differential pressure during operation was measured by connecting the upstream side (supply water side) and the downstream side (concentrate side) of a cylindrical pressure container in which the separation membrane element was installed by a pipe in which a differential pressure meter (type name: DG16) produced by Nagano Keiki Co., Ltd. is provided. As for the operation conditions, the supply water flow rate was 9 L/min and the operation pressure was 1.0 MPa. Water processed by a reverse osmosis membrane was used as the supply water. A cock of a permeate pipe was closed after removal of air bubbles from inside the element, and an element differential pressure (in kPa) was measured by an operation that was performed in a state no substantial membrane filtration could be performed, that is, all supply water was discharged as concentrate.

(Ratio of Sticking of Scale to Separation Membrane Surface)

The separation membrane element was put into a pressure container and caused to operate for 24 hours under conditions that the operation pressure was 0.5 MPa and the temperature was 25° C. using, as supply water, an aqueous solution of pH 7 containing $CaCl_2.H_2O$ at 1,150 ppm and $NaHCO_3$ at 660 ppm. The collection rate was set at 50%. After that, the separation membrane element was disassembled and an effective membrane portion measuring 5 cm×5 cm located on the downstream side (concentrate side) in the longitudinal direction of the separation membrane element was cut out. The cut-out separation membrane was dried and observed from above in the thickness direction of the separation membrane with a microscope, whereby a sticking area ratio of scale that precipitated on and stuck to the separation membrane surface was calculated.

(Repetitive Start/Stop Operations)

Supply water was caused to pass through the manufactured separation membrane element repetitively 100 times with the duration of 1 minute under conditions that the operation pressure was 0.5 MPa and the temperature was 25° C., supply water being saline water of 200 ppm in concentration and an NaCl aqueous solution of pH 6.5. After that, sampling was performed for 1 minute and a TDS concentration in each of supply water used in the operation of 1 minute and sampled permeate was determined by a conductance measurement and a TDS removal rate was calculated according to the following equation:

(TDS removal rate (%))=100×[1−{(TDS concentration in permeate)/(TDS concentration in supply water)}].

This removal rate was employed as a removal rate after repetitive start/stop operations.

Example 1

Evaluations were made under the above conditions using an evaluation cell for a manufactured supply-side channel member and putting a separation membrane element in the pressure container. Results were as shown in Table 1.

Examples 2-5 and 7-27

Separation membrane elements were manufactured in the same manner as in Example 1 except that supply-side channel members were as shown in Tables 1-4.

Each separation membrane element was put into the pressure container and each kind of performance was evaluated under the same conditions as in Example 1. Results were as shown in Tables 1-4.

Example 6

A separation membrane element was manufactured in the same manner as in Example 1 except that a permeation-side channel member was as shown in Table 1.

The separation membrane element was put into the pressure container and each kind of performance was evaluated under the same conditions as in Example 1. Results were as shown in Table 1.

Comparative Examples (Manufacture of Supply-Side Channel Member Q)

A cylindrical net having a net-shaped structure was formed using polypropylene as a material by supplying molten resin from an extruder while two inside and outside spinnerets in each of which many holes were arranged were rotated in opposite directions, whereby a net having a cylindrical fiber structure was manufactured. Structure controls were performed to finally obtain shapes of supply-side channel members shown in Tables 4 and 5 by changing the molten resin discharge pressure of the extruder and the taking speed.

(Manufacture of Permeation-Side Channel Member R)

A cylindrical net was manufactured using polypropylene as a material according to the same procedure as the supply-side channel member Q and then cooled and solidified. The cylindrical net was thereafter stretched in the longitudinal direction and then in the lateral direction in a heating furnace, whereby a net was manufactured that has a necked shape in which the thread diameter of a central portion of a fibrous object is smaller than that of intersection portions. Structure controls were performed to finally obtain shapes of supply-side channel members shown in Table 5 by changing the molten resin discharge pressure of the extruder, the longitudinal and lateral stretching ratios, and the taking speed.

Comparative Examples 1-8

Separation membrane elements were manufactured in the same manner as in Example 1 except that supply-side channel members were as shown in Tables 4 and 5.

Each separation membrane element was put into the pressure container and each kind of performance was evaluated under the above-mentioned conditions. Results were as shown in Tables 4 and 5.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Supply-side channel member | Type | P | P | P | P | P | P | P |
| | Thread diameter of intersection portion (mm) | 0.6 | 0.6 | 0.6 | 0.6 | 0.6 | 0.6 | 0.6 |
| | Thread diameter of central portion (mm) | 0.29 | 0.30 | 0.30 | 0.31 | 0.30 | 0.29 | 0.29 |
| | Maximum value of thread diameter of central portion (mm) | 0.34 | 0.39 | 0.38 | 0.38 | 0.38 | 0.34 | 0.35 |
| | Minimum value of thread diameter of central portion (mm) | 0.26 | 0.26 | 0.26 | 0.25 | 0.24 | 0.26 | 0.27 |
| | (Thread diameter of central portion)/(thread diameter of large diameter portion) | 0.75 | 0.74 | 0.71 | 0.74 | 0.70 | 0.75 | 0.75 |
| | Thickness (mm) | 0.60 | 0.60 | 0.60 | 0.60 | 0.60 | 0.60 | 0.60 |
| | Supply-side channel area ratio (%) | 51 | 52 | 53 | 52 | 54 | 51 | 51 |
| | Void volume of supply-side channel member (×10$^{-5}$ m$^3$) | 4.9 | 5.0 | 5.0 | 5.1 | 5.2 | 4.9 | 4.9 |
| | Supply-side channel volume of separation membrane element (×10$^{-5}$ m$^3$) | 4.7 | 4.6 | 4.4 | 4.3 | 4.2 | 4.7 | 4.7 |
| | Ratio of void volume of supply-side channel member to total volume of supply-side channel member (%) | 90 | 91 | 93 | 94 | 94 | 90 | 90 |
| | Ratio of supply-side channel volume of separation membrane element to void volume of supply-side channel member (%) | 96 | 92 | 88 | 84 | 81 | 96 | 96 |
| | Interval between intersection portions in longitudinal cross section parallel with fibrous row (mm) | 2.9 | 3.6 | 3.9 | 4.3 | 5.1 | 2.9 | 2.9 |
| | Interval between intersection | 3.5 | 4.5 | 4.8 | 5.0 | 6.1 | 3.5 | 3.5 |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
|  | portions in direction perpendicular to supply water flow direction of supply-side channel member (mm) |  |  |  |  |  |  |  |
|  | Interval between intersection portions in direction parallel with supply water flow direction of supply-side channel member (mm) | 4.5 | 5.5 | 6.2 | 7.1 | 8.2 | 4.5 | 4.5 |
|  | Proportion of area of contact of supply-side channel member to separation membrane | 0.14 | 0.12 | 0.13 | 0.13 | 0.12 | 0.12 | 0.15 |
|  | Fiber shape | Tapered | Tapered | Tapered | Tapered | Tapered | Tapered | Tapered |
|  | Taper direction | Raw water → concentrate | Raw water → concentrate | Raw water → concentrate | Raw water → concentrate | Raw water → concentrate | Raw water → concentrate | Random |
|  | Side-view shape | Different diameter | Different diameter | Different diameter | Different diameter | Different diameter | Different diameter | Different diameter |
|  | $D_1$ (mm) | 0.25 | 0.25 | 0.25 | 0.25 | 0.25 | 0.25 | 0.25 |
|  | $D_2$ (mm) | 0.5 | 0.5 | 0.5 | 0.5 | 0.5 | 0.5 | 0.5 |
|  | $L_1$ (mm) | 0.65 | 0.65 | 0.65 | 0.65 | 0.65 | 0.65 | 0.65 |
|  | $L_2$ (mm) | 0.65 | 0.65 | 0.65 | 0.65 | 0.65 | 0.65 | 0.65 |
|  | $L_3$ (mm) | 1.6 | 1.96 | 2.2 | 2.43 | 2.85 | 1.6 | 1.6 |
|  | Taper ratio T | 1/6 | 1/8 | 1/9 | 1/9 | 5/57 | 1/6 | 1/6 |
|  | Bending resistance (m) | 0.1 | 0.09 | 0.085 | 0.08 | 0.075 | 0.08 | 0.1 |
|  | Unit weight (g/m$^2$) | 50 | 47 | 44 | 40 | 37 | 50 | 50 |
|  | $W_1$ (mm) | 0.35 | 0.36 | 0.36 | 0.38 | 0.36 | 0.35 | 0.35 |
|  | $W_2$ (mm) | 0.22 | 0.23 | 0.23 | 0.24 | 0.23 | 0.22 | 0.22 |
|  | $W_1/W_2$ | 1.60 | 1.60 | 1.60 | 1.60 | 1.60 | 1.60 | 1.60 |
|  | Fiber inclination angle (°) | 45 | 45 | 45 | 45 | 45 | 45 | 45 |
| Permeation-side channel member | Type | Double denbigh | Double denbigh | Double denbigh | Double denbigh | Double denbigh | Circular-knit | Double denbigh |
|  | Thickness (mm) | 0.26 | 0.26 | 0.26 | 0.26 | 0.26 | 0.26 | 0.26 |
| Element performance | Water production rate (GPD) | 910 | 900 | 905 | 895 | 880 | 925 | 890 |
|  | Removal rate (%) | 99.30 | 99.20 | 99.10 | 99.00 | 99.00 | 99.30 | 99.02 |
|  | Element differential pressure (kPa) | 22 | 24 | 25 | 28 | 30 | 22 | 29 |
|  | Ratio of sticking of scale to separation membrane surface | 0.13 | 0.14 | 0.12 | 0.15 | 0.16 | 0.12 | 0.15 |
|  | Removal rate after repetitive start/stop operations | 99.00 | 98.90 | 98.80 | 98.70 | 98.60 | 99.00 | 98.90 |

TABLE 2

|  |  | Ex. 8 | Ex. 9 | Ex. 10 | Ex. 11 | Ex. 12 | Ex. 13 | Ex. 14 |
|---|---|---|---|---|---|---|---|---|
| Supply-side channel member | Type | P | P | P | P | P | P | P |
|  | Thread diameter of intersection portion (mm) | 0.6 | 0.6 | 0.6 | 0.6 | 0.6 | 0.6 | 0.6 |
|  | Thread diameter of central portion (mm) | 0.30 | 0.29 | 0.28 | 0.27 | 0.27 | 0.26 | 0.24 |
|  | Maximum value of thread diameter of central portion (mm) | 0.33 | 0.34 | 0.33 | 0.32 | 0.31 | 0.28 | 0.26 |
|  | Minimum value of thread diameter of central portion (mm) | 0.25 | 0.26 | 0.26 | 0.25 | 0.25 | 0.24 | 0.22 |
|  | (Thread diameter of central portion)/(thread diameter of large diameter portion) | 0.75 | 0.77 | 0.73 | 0.72 | 0.71 | 0.69 | 0.67 |
|  | Thickness (mm) | 0.60 | 0.60 | 0.60 | 0.60 | 0.60 | 0.60 | 0.60 |
|  | Supply-side channel area ratio (%) | 51 | 49 | 52 | 53 | 54 | 56 | 62 |
|  | Void volume of supply-side channel member (×10$^{-5}$ m$^3$) | 4.9 | 4.9 | 4.9 | 5.0 | 5.0 | 5.0 | 5.1 |
|  | Supply-side channel volume of separation membrane element (×10$^{-5}$ m$^3$) | 4.7 | 4.7 | 4.7 | 4.7 | 4.7 | 4.7 | 4.7 |
|  | Ratio of void volume of supply-side channel member to total volume of supply-side channel member (%) | 90 | 91 | 91 | 92 | 92 | 93 | 95 |
|  | Ratio of supply-side channel volume of separation membrane element to void volume of supply-side channel member | 96 | 96 | 96 | 95 | 95 | 94 | 92 |

TABLE 2-continued

|  |  | Ex. 8 | Ex.9 | Ex. 10 | Ex. 11 | Ex. 12 | Ex. 13 | Ex. 14 |
|---|---|---|---|---|---|---|---|---|
|  | (%) |  |  |  |  |  |  |  |
|  | Interval between intersection portions in longitudinal cross section parallel with fibrous row (mm) | 2.9 | 2.9 | 2.9 | 2.9 | 2.9 | 2.9 | 2.9 |
|  | Interval between intersection portions in direction perpendicular to supply water flow direction of supply-side channel member (mm) | 3.5 | 3.5 | 3.5 | 3.5 | 3.5 | 3.5 | 3.5 |
|  | Interval between intersection portions in direction parallel with supply water flow direction of supply-side channel member (mm) | 4.5 | 4.5 | 4.5 | 4.5 | 4.5 | 4.5 | 4.5 |
|  | Proportion of area of contact of supply-side channel member to separation membrane | 0.15 | 0.13 | 0.13 | 0.12 | 0.12 | 0.11 | 0.1 |
|  | Fiber shape | Tapered | Tapered | Tapered | Tapered | Tapered | Tapered | Tapered |
|  | Taper direction | Concentrate → raw water | Raw water → concentrate | Raw water → concentrate | Raw water → concentrate | Raw water → concentrate | Raw water → concentrate | Raw water → concentrate |
|  | Side-view shape | Different diameter | Different diameter | Different diameter | Different diameter | Different diameter | Different diameter | Different diameter |
|  | $D_1$ (mm) | 0.25 | 0.25 | 0.25 | 0.25 | 0.25 | 0.25 | 0.25 |
|  | $D_2$ (mm) | 0.5 | 0.5 | 0.5 | 0.5 | 0.5 | 0.5 | 0.5 |
|  | $L_1$ (mm) | 0.65 | 0.65 | 0.65 | 0.65 | 0.65 | 0.65 | 0.65 |
|  | $L_2$ (mm) | 0.65 | 2/3 | 0.65 | 0.65 | 0.65 | 0.65 | 0.65 |
|  | $L_3$ (mm) | 1.6 | 1.6 | 1.6 | 1.6 | 1.6 | 1.6 | 1.6 |
|  | Taper ratio T | 1/6 | 1/6 | 1/6 | 1/6 | 1/6 | 1/6 | 1/6 |
|  | Bending resistance (m) | 0.1 | 0.105 | 0.095 | 0.09 | 0.085 | 0.08 | 0.072 |
|  | Unit weight (g/m²) | 50 | 55 | 51 | 50 | 49 | 45 | 40 |
|  | $W_1$ (mm) | 0.36 | 0.35 | 0.34 | 0.32 | 0.32 | 0.31 | 0.28 |
|  | $W_2$ (mm) | 0.23 | 0.22 | 0.21 | 0.20 | 0.20 | 0.19 | 0.17 |
|  | $W_1/W_2$ | 1.60 | 1.60 | 1.60 | 1.60 | 1.60 | 1.60 | 1.60 |
|  | Fiber inclination angle (°) | 45 | 45 | 45 | 45 | 45 | 45 | 45 |
| Permeation-side channel member | Type | Double denbigh | Double denbigh | Double denbigh | Double denbigh | Double denbigh | Double denbigh | Double denbigh |
|  | Thickness (mm) | 0.26 | 0.26 | 0.26 | 0.26 | 0.26 | 0.26 | 0.26 |
| Element performance | Water production rate (GPD) | 885 | 915 | 900 | 905 | 915 | 920 | 910 |
|  | Removal rate (%) | 98.90 | 99.40 | 99.30 | 99.32 | 99.31 | 99.28 | 99.25 |
|  | Element differential pressure (kPa) | 30 | 21 | 24 | 23 | 21 | 19 | 22 |
|  | Ratio of sticking of scale to separation membrane surface | 0.16 | 0.13 | 0.13 | 0.12 | 0.13 | 0.11 | 0.10 |
|  | Removal rate after repetitive | 98.60 | 99.10 | 99.00 | 99.04 | 98.99 | 98.96 | 98.91 |

TABLE 3

|  |  | Ex. 15 | Ex. 16 | Ex. 17 | Ex. 18 | Ex. 19 | Ex. 20 | Ex. 21 |
|---|---|---|---|---|---|---|---|---|
| Supply-side channel member | Type | P | P | P | P | P | P | P |
|  | Thread diameter of intersection portion (mm) | 0.6 | 0.6 | 0.6 | 0.6 | 0.6 | 0.6 | 0.6 |
|  | Thread diameter of central portion (mm) | 0.3 | 0.29 | 0.28 | 0.29 | 0.29 | 0.3 | 0.29 |
|  | Maximum value of thread diameter of central portion (mm) | 0.33 | 0.34 | 0.32 | 0.33 | 0.32 | 0.32 | 0.32 |
|  | Minimum value of thread diameter of central portion (mm) | 0.27 | 0.26 | 0.26 | 0.26 | 0.26 | 0.28 | 0.27 |
|  | (Thread diameter of central portion)/(thread diameter of large diameter portion) | 0.75 | 0.75 | 0.75 | 0.75 | 0.75 | 0.75 | 0.75 |
|  | Thickness (mm) | 0.6 | 0.6 | 0.6 | 0.6 | 0.6 | 0.6 | 0.6 |
|  | Supply-side channel area ratio (%) | 51 | 51 | 51 | 51 | 51 | 51 | 50 |
|  | Void volume of supply-side channel member (×10⁻⁵ m³) | 4.89 | 4.94 | 4.86 | 4.97 | 4.81 | 5.02 | 4.91 |
|  | Supply-side channel volume of separation membrane element (×10⁻⁵ m³) | 4.64 | 4.74 | 4.57 | 4.77 | 4.47 | 4.87 | 4.77 |
|  | Ratio of void volume of supply-side channel member to total volume of supply-side channel member (%) | 90.5 | 91.5 | 90 | 92 | 89 | 93 | 91 |
|  | Ratio of supply-side channel | 95 | 96 | 94 | 96 | 93 | 97 | 97 |

TABLE 3-continued

| | | Ex. 15 | Ex. 16 | Ex. 17 | Ex. 18 | Ex. 19 | Ex. 20 | Ex. 21 |
|---|---|---|---|---|---|---|---|---|
| | volume of separation membrane element to void volume of supply-side channel member (%) | | | | | | | |
| | Interval between intersection portions in longitudinal cross section parallel with fibrous row (mm) | 2.9 | 2.9 | 2.9 | 2.9 | 2.9 | 2.9 | 2.9 |
| | Interval between intersection portions in direction perpendicular to supply water flow direction of supply-side channel member (mm) | 3.5 | 3.5 | 3.5 | 3.5 | 3.5 | 3.5 | 3.5 |
| | Interval between intersection portions in direction parallel with supply water flow direction of supply-side channel member (mm) | 4.5 | 4.5 | 4.5 | 4.5 | 4.5 | 4.5 | 4.5 |
| | Proportion of area of contact of supply-side channel member to separation membrane | 0.13 | 0.14 | 0.13 | 0.15 | 0.16 | 0.2 | 0.14 |
| | Fiber shape | Tapered | Tapered | Tapered | Tapered | Tapered | Tapered | Tapered |
| | Taper direction | Raw water → concentrate | Raw water → concentrate | Raw water → concentrate | Raw water → concentrate | Raw water → concentrate | Raw water → concentrate | Raw water → concentrate |
| | Side-view shape | Different diameter | Different diameter | Different diameter | Different diameter | Different diameter | Different diameter | Different diameter |
| | $D_1$ (mm) | 0.25 | 0.25 | 0.25 | 0.25 | 0.25 | 0.25 | 0.33 |
| | $D_2$ (mm) | 0.37 | 0.65 | 0.334 | 0.78 | 0.3 | 1.05 | 0.6 |
| | $L_1$ (mm) | 0.65 | 0.65 | 0.65 | 0.65 | 0.65 | 0.65 | 0.65 |
| | $L_2$ (mm) | 0.65 | 0.65 | 0.65 | 0.65 | 0.65 | 0.65 | 0.65 |
| | $L_3$ (mm) | 1.6 | 1.6 | 1.6 | 1.6 | 1.6 | 1.6 | 1.6 |
| | Taper ratio T | 1/14 | 1/4 | 1/19 | 1/3 | 1/32 | 1/2 | 1/6 |
| | Bending resistance (m) | 0.085 | 0.075 | 0.083 | 0.089 | 0.12 | 0.14 | 0.11 |
| | Unit weight (g/m$^2$) | 49 | 55 | 45 | 80 | 30 | 100 | 70 |
| | $W_1$ (mm) | 0.36 | 0.35 | 0.34 | 0.35 | 0.35 | 0.36 | 0.43 |
| | $W_2$ (mm) | 0.23 | 0.22 | 0.21 | 0.22 | 0.22 | 0.23 | 0.17 |
| | $W_1/W_2$ | 1.60 | 1.60 | 1.60 | 160 | 1.60 | 1.60 | 2.50 |
| | Fiber inclination angle (°) | 45 | 45 | 45 | 45 | 45 | 45 | 45 |
| Permeation-side channel member | Type | Double denbigh | Double denbigh | Double denbigh | Double denbigh | Double denbigh | Double denbigh | Double denbigh |
| | Thickness (mm) | 0.26 | 0.26 | 0.26 | 0.26 | 0.26 | 0.26 | 0.26 |
| Element performance | Water production rate (GPD) | 920 | 910 | 922 | 900 | 880 | 870 | 910 |
| | Removal rate (%) | 99.30 | 99.34 | 99.29 | 99.38 | 99.3 | 99.03 | 99.42 |
| | Element differential pressure (kPa) | 20 | 22 | 20 | 23 | 29 | 32 | 22 |
| | Ratio of sticking of scale to separation membrane surface | 0.12 | 0.13 | 0.12 | 0.14 | 0.18 | 0.21 | 0.10 |
| | Removal rate after repetitive | 98.90 | 99.05 | 98.90 | 99.12 | 98.95 | 98.70 | 99.11 |

TABLE 4

| | | Ex. 22 | Ex. 23 | Ex. 25 | Ex. 26 | Ex. 27 | Comparative Ex. 1 | Comparative Ex. 2 |
|---|---|---|---|---|---|---|---|---|
| Supply-side channel member | Type | P | P | P | P | P | Q | Q |
| | Thread diameter of intersection portion (mm) | 0.6 | 0.6 | 0.6 | 0.6 | 0.6 | 0.60 | 0.60 |
| | Thread diameter of central portion (mm) | 0.29 | 0.28 | 0.32 | 0.25 | 0.29 | 0.34 | 0.33 |
| | Maximum value of thread diameter of central portion (mm) | 0.31 | 0.3 | 0.35 | 0.27 | 0.34 | 0.41 | 0.42 |
| | Minimum value of thread diameter of central portion (mm) | 0.27 | 0.26 | 0.30 | 0.23 | 0.26 | 0.29 | 0.28 |
| | (Thread diameter of central portion)/(thread diameter of large diameter portion) | 0.78 | 0.71 | 0.80 | 0.73 | 0.74 | 1.00 | 1.03 |
| | Thickness (mm) | 0.6 | 0.6 | 0.6 | 0.6 | 0.6 | 0.60 | 0.60 |
| | Supply-side channel area ratio (%) | 48 | 53 | 47 | 52 | 51 | 37 | 42 |
| | Void volume of supply-side channel member (×10$^{-5}$ m$^3$) | 4.86 | 4.97 | 4.9 | 4.9 | 4.9 | 3.7 | 4.8 |
| | Supply-side channel volume of separation membrane element (×10$^{-5}$ m$^3$) | 4.71 | 4.62 | 4.7 | 4.7 | 4.7 | 3.5 | 4.4 |
| | Ratio of void volume of supply-side channel member to total volume of supply-side channel member (%) | 90 | 92 | 90 | 90 | 90 | 86 | 91 |

TABLE 4-continued

|  |  | Ex. 22 | Ex. 23 | Ex. 25 | Ex. 26 | Ex. 27 | Comparative Ex. 1 | Comparative Ex. 2 |
|---|---|---|---|---|---|---|---|---|
|  | Ratio of supply-side channel volume of separation membrane element to void volume of supply-side channel member (%) | 97 | 93 | 96 | 96 | 96 | 95 | 92 |
|  | Interval between intersection portions in longitudinal cross section parallel with fibrous row (mm) | 2.9 | 2.9 | 2.9 | 2.9 | 2.9 | 2.9 | 3.6 |
|  | Interval between intersection portions in direction perpendicular to supply water flow direction of supply-side channel member (mm) | 3.5 | 3.5 | 3.5 | 3.5 | 3.5 | 3.5 | 4.5 |
|  | Interval between intersection portions in direction parallel with supply water flow direction of supply-side channel member (mm) | 4.5 | 4.5 | 4.5 | 4.5 | 4.5 | 4.5 | 5.5 |
|  | Proportion of area of contact of supply-side channel member to separation membrane | 0.15 | 0.12 | 0.14 | 0.13 | 0.13 | 0.25 | 0.24 |
|  | Fiber shape | Tapered | Tapered | Tapered | Tapered | Tapered | Cylindrical | Cylindrical |
|  | Taper direction | Raw water → concentrate | Raw water → concentrate | Raw water → concentrate | Raw water → concentrate | Raw water → concentrate | — | — |
|  | Side-view shape | Different diameter | Different diameter | Different diameter | Different diameter | Different diameter | Cylindrical | Cylindrical |
|  | $D_1$ (mm) | 0.4 | 0.25 | 0.25 | 0.25 | 0.25 | 0.35 | 0.35 |
|  | $D_2$ (mm) | 0.65 | 0.5 | 0.5 | 0.5 | 0.5 | 0.35 | 0.35 |
|  | $L_1$ (mm) | 0.65 | 0.65 | 0.65 | 0.65 | 0.65 | 0.35 | 0.35 |
|  | $L_2$ (mm) | 0.65 | 0.65 | 0.65 | 0.65 | 0.65 | 0.35 | 0.35 |
|  | $L_3$ (mm) | 1.6 | 1.6 | 1.6 | 1.6 | 1.6 | 2.15 | 2.85 |
|  | Taper ratio T | 1/6 | 1/6 | 1/6 | 1/6 | 1/6 | — | — |
|  | Bending resistance (m) | 0.12 | 0.075 | 0.107 | 0.102 | 0.105 | 0.14 | 0.13 |
|  | Unit weight (g/m$^2$) | 80 | 40 | 55 | 55 | 55 | 130 | 125 |
|  | $W_1$ (mm) | 0.56 | 0.22 | 0.42 | 0.42 | 0.42 | 0.32 | 0.32 |
|  | $W_2$ (mm) | 0.18 | 0.20 | 0.26 | 0.26 | 0.26 | 0.2 | 0.2 |
|  | $W_1/W_2$ | 3.10 | 1.10 | 1.62 | 1.62 | 1.62 | 1.60 | 1.60 |
|  | Fiber inclination angle (°) | 45 | 45 | 0 | 90 | 135 | 45 | 45 |
| Permeation-side channel member | Type | Double denbigh | Double denbigh | Double denbigh | Double denbigh | Double denbigh | Double denbigh | Double denbigh |
|  | Thickness (mm) | 0.26 | 0.26 | 0.26 | 0.26 | 0.26 | 0.26 | 0.26 |
| Element performance | Water production rate (GPD) | 900 | 865 | 880 | 910 | 905 | 860 | 870 |
|  | Removal rate (%) | 99.45 | 99.2 | 99.1 | 99.30 | 99.28 | 98.8 | 98.8 |
|  | Element differential pressure (kPa) | 24 | 35 | 35 | 23 | 22 | 38 | 42 |
|  | Ratio of sticking of scale to separation membrane surface | 0.09 | 0.13 | 0.16 | 0.14 | 0.14 | 0.23 | 0.22 |
|  | Removal rate after repetitive | 99.18 | 98.70 | 98.80 | 99.05 | 99.02 | 97.00 | 97.00 |

TABLE 5

|  |  | Comparative Ex. 3 | Comparative Ex. 4 | Comparative Ex. 5 | Comparative Ex. 6 | Comparative Ex. 7 | Comparative Ex. 8 |
|---|---|---|---|---|---|---|---|
| Supply-side channel member | Type | Q | R | R | R | P | P |
|  | Thread diameter of intersection portion (mm) | 0.60 | 0.60 | 0.60 | 0.60 | 0.60 | 0.60 |
|  | Thread diameter of central portion (mm) | 0.34 | 0.15 | 0.14 | 0.2 | 0.36 | 0.35 |
|  | Maximum value of thread diameter of central portion (mm) | 0.40 | 0.16 | 0.16 | 0.22 | 0.38 | 0.37 |
|  | Minimum value of thread diameter of central portion (mm) | 0.27 | 0.14 | 0.12 | 0.18 | 0.34 | 0.33 |
|  | (Thread diameter of central portion)/(thread diameter of large diameter portion) | 0.98 | 0.38 | 0.36 | 0.42 | 0.9 | 0.88 |
|  | Thickness (mm) | 0.60 | 0.60 | 0.60 | 0.6 | 0.60 | 0.60 |
|  | Supply-side channel area ratio (%) | 46 | 66 | 69 | 56 | 37 | 42 |
|  | Void volume of supply-side channel member ($\times 10^{-5}$ m$^3$) | 4.9 | 5.0 | 5.1 | 4.9 | 4.5 | 4.6 |
|  | Supply-side channel volume of separation membrane element ($\times 10^{-5}$ m$^3$) | 4.0 | 4.5 | 4.5 | 4.7 | 4.4 | 4.5 |
|  | Ratio of void volume of supply-side | 93 | 93 | 95 | 91 | 84 | 85 |

TABLE 5-continued

|  |  | Comparative Ex. 3 | Comparative Ex. 4 | Comparative Ex. 5 | Comparative Ex. 6 | Comparative Ex. 7 | Comparative Ex. 8 |
|---|---|---|---|---|---|---|---|
|  | channel member to total volume of supply-side channel member (%) |  |  |  |  |  |  |
|  | Ratio of supply-side channel volume of separation membrane element to void volume of supply-side channel member (%) | 82 | 90 | 87 | 95 | 98 | 97 |
|  | Interval between intersection portions in longitudinal cross section parallel with fibrous row (mm) | 5.1 | 2.9 | 2.9 | 2.9 | 2.9 | 2.9 |
|  | Interval between intersection portions in direction perpendicular to supply water flow direction of supply-side channel member (mm) | 6.1 | 3.5 | 3.5 | 3.5 | 3.5 | 3.5 |
|  | Interval between intersection portions in direction parallel with supply water flow direction of supply-side channel member (mm) | 8.2 | 4.5 | 4.5 | 4.5 | 4.5 | 4.5 |
|  | Proportion of area of contact of supply-side channel member to separation membrane | 0.21 | 0.14 | 0.13 | 0.15 | 0.22 | 0.21 |
|  | Fiber shape | Cylindrical | Necked | Necked | Necked | Tapered | Tapered |
|  | Taper direction | — | — | — | — | Raw water → concentrate | Raw water → concentrate |
|  | Side-view shape | Cylindrical | Different diameter | Different diameter | Different diameter | Different diameter | Different diameter |
|  | $D_1$ (mm) | 0.35 | 0.42 | 0.42 | 0.42 | 0.25 | 0.25 |
|  | $D_2$ (mm) | 0.35 | 0.42 | 0.42 | 0.42 | 0.5 | 0.5 |
|  | $L_1$ (mm) | 0.35 | 0.50 | 0.50 | 0.50 | 0.65 | 0.65 |
|  | $L_2$ (mm) | 0.35 | 0.50 | 0.50 | 0.50 | 0.65 | 0.65 |
|  | $L_3$ (mm) | 4.41 | 1.85 | 1.85 | 1.85 | 1.6 | 1.6 |
|  | Taper ratio T | — | — | — | — | 1/6 | 1/6 |
|  | Bending resistance (m) | 0.12 | 0.045 | 0.04 | 0.05 | 0.13 | 0.12 |
|  | Unit weight (g/m²) | 120 | 18 | 16 | 20 | 100 | 95 |
|  | $W_1$ (mm) | 0.32 | 0.21 | 0.20 | 0.28 | 0.32 | 0.32 |
|  | $W_2$ (mm) | 0.2 | 0.13 | 0.12 | 0.18 | 0.2 | 0.2 |
|  | $W_1/W_2$ | 1.60 | 1.60 | 1.60 | 1.60 | 1.6 | 1.6 |
|  | Fiber inclination angle (°) | 45 | 45 | 45 | 45 | 45 | 45 |
| Permeation-side channel member | Type | Double denbigh | Double denbigh | Double denbigh | Double denbigh | Double denbigh | Double denbigh |
|  | Thickness (mm) | 0.26 | 0.26 | 0.26 | 0.26 | 0.26 | 0.26 |
| Element performance | Water production rate (GPD) | 855 | 885 | 875 | 908 | 855 | 860 |
|  | Removal rate (%) | 98.6 | 99.05 | 99.01 | 99.15 | 99.15 | 99.2 |
|  | Element differential pressure (kPa) | 38 | 28 | 30 | 22 | 35 | 32 |
|  | Ratio of sticking of scale to separation membrane surface | 0.25 | 0.18 | 0.17 | 0.19 | 0.24 | 0.23 |
|  | Removal rate after repetitive | 96.80 | 94.40 | 94.10 | 95.20 | 99.05 | 99.10 |

As is apparent from the results shown in Tables 1-4, it can be said that the separation membrane elements of Examples 1-27 do not impair flow of supply water and exhibits superior separation performance stably.

On the other hand, in Comparative Examples 1 and 2, although the interval between intersection portions, in each of the directions perpendicular to and parallel with the supply water flow direction, of the supply-side channel member was the same as in Examples 1 and 2, the thread diameter of the central portions was large. As a result, the supply-side channel area ratio was small, the element differential pressure became high, and the element water production rate and the removal rate were decreased.

In Comparative Example 3, the fiber diameter of the central portion was large and the interval between intersection portions, in each of the directions perpendicular to and parallel with the supply water flow direction, of the supply-side channel member was large.

As a result, the separation membrane main body fell into net void portions during manufacturing the element and stability of a channel in a portion adjacent to the supply water inflow end surface was not established sufficiently, resulting in a large element differential pressure and decrease of the element water production rate and the removal rate.

Furthermore, in Comparative Examples 1-3, since the fiber shape and the side-view shape were cylindrical, the area of contact between the membrane surface and the fibers was large and the supply-side channel area ratio was small. As a result, the flow resistance was high, the element differential pressure was large, resulting in decrease of the element water production rate and the removal rate.

In addition, in Comparative Examples 1-3, since the proportion of the area of contact of the supply-side channel member to a separation membrane was large and there occurred many supply water stagnation portions on the surface of each separation membrane, the turbidity removability during operation was low and much scale stuck to the separation membrane surfaces.

In Comparative Examples 4 and 5, since the fiber shape was a necked shape and the bending resistance was small, the net was prone to slip when repetitive start/stop operations are performed and the removal rate after repetitive start/stop operations was small.

Furthermore, in Comparative Examples 4 and 5, since the supply-side channel area ratio was too large, membrane falling occurred between the intersections of the supply-side channel member, the element differential pressure was high, and the element water production rate and the removal rate were decreased.

In Comparative Example 6, whereas the taper and the supply-side channel area ratio were equivalent, a necking shape was employed. Thus, energy loss occurred due to rapid expansion and contraction of the channels, the element differential pressure was high, and the element water production rate and the removal rate were decreased.

In Comparative Examples 7 and 8, whereas the fiber shape was a tapered shape, the supply-side channel area ratio was too small. As a result, the element differential pressure was high and the element water production rate and the removal rate were decreased.

INDUSTRIAL APPLICABILITY

In particular, the membrane element according to the invention can be used suitably as an RO water purifier and for desalination of brackish water and seawater.

Although the invention has been described above using the particular embodiment, it is apparent that those skilled in the art that various changes and modifications are possible without departing from the spirit and scope of the invention. The present application is based on Japanese Patent Application No. 2019-157773 filed on Aug. 30, 2019, No. 2019-231577 filed on Dec. 23, 2019, and No. 2020-094335 filed on May 29, 2020, the entire disclosures of which are incorporated herein by reference.

DESCRIPTION OF SYMBOLS

1: Spiral-type separation membrane element
2: Supply-side channel member
2a-2e: Supply-side channel members
21: Fibrous object A
22: Fibrous object B
3: Separation membrane
4: Permeation-side channel member
5: Envelope-like membrane
6: Water collecting pipe
7: Supply water
8: Permeate
9: Concentrate
c: Interval between intersection portions of a supply-side channel member in the direction perpendicular to a supply water flow direction
d: Interval between intersection portions of the supply-side channel member in the direction parallel with the supply water flow direction
w: Web portion
$A_1$: Area of spaces in a longitudinal cross section that is parallel with a fibrous row
$A_2$: Area between two adjacent intersection portions in the longitudinal cross section that is parallel with the fibrous row
P: Intersection portion
$P_0$: Center between intersection portions
$P_1$: Intersection of arbitrary fibers
$P_2$: Intersection adjacent to $P_1$
$B_1$: One of intersections that are located on extensions of straight lines determining the intersection $P_1$ and are closest to the intersection $P_1$
$B_2$: One of intersections that are located on extensions of straight lines determining the intersection $P_1$ and are closest to the intersection $P_1$
$B_3$: One of intersections that are located on extensions of straight lines determining the intersection $P_1$ and are closest to the intersection $P_1$
$B_4$: One of intersections that are located on extensions of straight lines determining the intersection $P_1$ and are closest to the intersection $P_1$
$Q_1$: Point that maximizes the distance to the point $P_1$ among points where diagonal lines connecting $P_1$ and four adjacent corners intersect the outline of the resin
$Q_2$: Point that maximizes the distance to the point $P_2$ among points where diagonal lines connecting $P_2$ and four adjacent corners intersect the outline of the resin
$L_1$: Distance between two adjacent intersection portions (length of a line segment $P_1Q_1$)
$L_2$: Distance between two adjacent intersection portions (length of a line segment $P_2Q_2$)
$L_3$: Length obtained by subtracting $L_1$ and $L_2$ from the length of a line segment $P_1P_2$
$L_4$: Thickness of intersection portions
$L_5$: Average thickness of central portions
$R_1$: Distance between intersection portions when observation is made from the side
$R_2$: Central portion between the intersection portions
$C_1$: Circle having $L_1$ as its radius
$C_2$: Circle having $L_2$ as its radius
$D_1$: Fiber diameter determined by a tangential line, perpendicular to $P_1P_2$, to $C_1$
$D_2$: Fiber diameter determined by a tangential line, perpendicular to $P_1P_2$, to $C_2$
$D_3$: Large diameter portion (line segment, that passes through a fibrous object A, tangential to a cross section of a fibrous object B)
$D_4$: Large diameter portion (line segment, that passes through a fibrous object A, tangential to a cross section of a fibrous object B')
$W_1$: Maximum diameter of transverse cross section of a fiber
$W_2$: Maximum diameter in the direction perpendicular to the direction of $W_1$

The invention claimed is:

1. A separation membrane element comprising at least a water collecting pipe, separation membranes, a supply-side channel member, and a permeation-side channel member, wherein:
the supply-side channel member is interposed between two surfaces of the separation membranes to form a supply-side channel;
the supply-side channel member has a net shape in which plural fibrous rows X comprising fibrous objects A and arranged in one direction and plural fibrous rows Y comprising fibrous objects B and arranged in a different direction than the fibrous rows X cross each other sterically to form intersections;
at least one of the fibrous objects A and the fibrous objects B have a large diameter portion and a small diameter portion along a longitudinal direction;
in a longitudinal cross section including an arbitrary fibrous row and taken along a longitudinal direction of the arbitrary fibrous row, at least one of the fibrous objects A and the fibrous objects B comprise a thread that is thinner at a central portion located between intersection portions of the fibrous rows X and the fibrous rows Y than at the large diameter portion;

a supply-side channel area ratio is in a range of 45% to 65% defined by $A_1/A_2 \times 100$ where $A_1$ is the average area of the entire space within the thickness of the intersection portions in a longitudinal cross section taken along a longitudinal direction of a fibrous row, and $A_2$ is the average area within the thickness of intersection portions between two adjacent intersection portions in the longitudinal cross section; and when a surface of the supply-side channel member is observed from a thickness direction, a fiber between an arbitrary intersection and an adjacent intersection is a tapered fiber whose diameter increases like a taper in a direction from one intersection to the other intersection.

2. The separation membrane element according to claim 1, wherein the tapered fiber has a taper ratio in a range of $1/20$ to $1/3$.

3. The separation membrane element according to claim 2, wherein the tapered fiber has a tapered shape from a raw water side toward a concentrate side.

4. The separation membrane element according to claim 3, wherein the supply-side channel member has a bending resistance (m) larger than or equal to 0.07 m and smaller than or equal to 0.14 m.

5. The separation membrane element according to claim 4, wherein the supply-side channel member has a ratio of a void volume v to a total volume V which is represented by a product of a thickness and an area of the supply-side channel member in a range of 90% to 97%.

6. The separation membrane element according to claim 4, wherein a ratio of a supply-side channel volume F of the separation membrane element to the void volume v of the supply-side channel member is larger than or equal to 90%.

7. The separation membrane element according to claim 4, wherein an interval between intersection portions in a direction perpendicular to a raw water flow direction of the supply-side channel member is in a range of 3 to 5 mm.

8. The separation membrane element according to claim 4, wherein an interval between intersection portions in a direction parallel with a raw water flow direction of the supply-side channel member is in a range of 4 to 8 mm.

9. The separation membrane element according to claim 4, wherein in a transverse cross section Z taken perpendicularly to a longitudinal direction of an arbitrary fibrous object of the supply-side channel member, the supply-side channel member satisfies a relationship of $1.2 < W_1/W_2 < 3.0$, where $W_1$ is a maximum diameter of the arbitrary fibrous object and $W_2$ is a maximum diameter in a direction perpendicular to the direction of the maximum diameter $W_1$.

10. The separation membrane element according to claim 4, wherein the permeation-side channel member is made of a circular-knit tricot.

* * * * *